US010976069B2

(12) United States Patent
Song et al.

(10) Patent No.: US 10,976,069 B2
(45) Date of Patent: Apr. 13, 2021

(54) FLOW DEVICE AND CONTROL SYSTEM AND METHODS FOR HVAC SYSTEM MONITORING

(71) Applicant: The Board of Regents of the University of Oklahoma, Norman, OK (US)

(72) Inventors: Li Song, Norman, OK (US); Gang Wang, Palmetto Bay, FL (US)

(73) Assignee: The Board of Regents of the University of Oklahoma, Norman, OK (US)

(*) Notice: Subject to any disclaimer, the term of this patent is extended or adjusted under 35 U.S.C. 154(b) by 182 days.

(21) Appl. No.: 16/230,422

(22) Filed: Dec. 21, 2018

(65) Prior Publication Data

US 2019/0203966 A1    Jul. 4, 2019

Related U.S. Application Data

(60) Provisional application No. 62/612,011, filed on Dec. 29, 2017, provisional application No. 62/615,754, filed on Jan. 10, 2018.

(51) Int. Cl.
*F24F 11/49* (2018.01)
*F24F 11/84* (2018.01)
(Continued)

(52) U.S. Cl.
CPC .......... *F24F 11/49* (2018.01); *F16K 37/0083* (2013.01); *F24F 11/84* (2018.01);
(Continued)

(58) Field of Classification Search
CPC .. F24F 11/46; F24F 11/56; F24F 11/54; F24F 11/49; F24F 11/84; F24F 2110/30;
(Continued)

(56) References Cited

U.S. PATENT DOCUMENTS

2010/0076607 A1\* 3/2010 Ahmed .................. G06F 1/206
  700/276
2019/0323720 A1\* 10/2019 Challa ..................... F24F 11/62

OTHER PUBLICATIONS

Andiroglu, E., G. Wang and L. Song, Development of a Virtual Water flow Meter using Pump Head and Motor Power. Zero Energy Mass Customization Housing (ZEMCH2013) International Conference, 2013, Miami, FL.

(Continued)

*Primary Examiner* — Michael J Brown
(74) *Attorney, Agent, or Firm* — Dunlap Codding, P.C.

(57) ABSTRACT

Flow device systems for use in an HVAC system ("HVAC") are described. The system may include a controller receiving sensor signals including differential pressure, valve commands, fan/pump speed, and fan/pump motor power signal from the HVAC. The controller transmits override valve commands for multiple valve positions of the valve and multiple speeds of the fan and pump. A characteristic curve may be determined from the signals provided from the HVAC and the measured flow rate at each valve position or fan/pump speed during transmission of the plurality of override valve commands for the valve positions of the valve and fan/pump speed for fan/pump operation frequencies. Virtual flow rate through the valve, fan or pump is determined using the characteristic curve. In addition, valve dynamic behavior is determined using valve stiction and valve stiction plus deadband. Valve commands are updated based on valve dynamic behavior and a valve characteristic curve.

18 Claims, 15 Drawing Sheets

(51) Int. Cl.
  F16K 37/00    (2006.01)
  G05B 15/02    (2006.01)
  G05B 13/04    (2006.01)
  G05B 13/02    (2006.01)
  F24F 110/30   (2018.01)
  F24F 140/12   (2018.01)
  F24F 140/10   (2018.01)
(52) U.S. Cl.
  CPC ....... F24F 2110/30 (2018.01); F24F 2140/10 (2018.01); F24F 2140/12 (2018.01)
(58) Field of Classification Search
  CPC ............. F24F 2140/12; F24F 2140/10; G05B 13/021; G05B 15/02; G05B 2219/2614; G05B 13/042; F16K 37/0083
  USPC ................................................ 700/276, 291
  See application file for complete search history.

(56) References Cited

OTHER PUBLICATIONS

Andiroglu, E., G. Wang, L. Song and K. Kiamehr, "Development of a virtual pump water flow meter using power derived from comprehensive energy loss analysis." Science and Technology for the Built Environment, 2016, 22(2): 214-226.

ASHRAE, ANSI/ASHRAE Standard 62.1-2016. Ventilation for Acceptable Indoor Air Quality. Atlanta, GA, American Society of Heating, Refrigerating and Air-Conditioning Engineers, 2016a.

ASHRAE, ANSI/ASHRAE/IESNA Standard 90.1-2016. Energy Standard for Buildings Except Low-Rise Residential Buildings. Atlanta, GA, American Society of Heating, Refrigerating and Air-Conditioning Engineers, 2016b.

ASHRAE, 2017 ASHRAE Handbook—Fundamentals. Atlanta, GA, American Society of Heating, Refrigerating and Air-Conditioning Engineers, 2017.

Bes-tech. "Flow Meters and Controllers." from http://www.bes-tech.net/products/. 2017.

Huang, G., S. Wang and Y. Sun, "Enhancing the reliability of chiller control using fused measurement of building cooling load." HVAC&R Research 2008, 14(6): 941-958.

Joo, I., M. Liu, J. Wang and K. Hansen, Application of new technologies during continuous commissioning. Proceedings of International Conference on Enhanced Building Operation, 2013, Berkeley, CA.

Lee, P. S. and A. Dexter, "A fuzzy sensor for measuring the mixed air temperature in air-handling units." Measurement, 2005, 37(1): 83-93.

Li, H. and J. E. Braun, "Decoupling features for diagnosis of reversing and check vales faults in heat pump." International Journal of Refrigeration, 2008, 32(2): 316-326.

Li, H. and J. E. Braun, "Development, evaluation, and demonstration of a virtual refrigerant charge sensor." HVAC&R Research, 2009a, 15(1): 117-136.

Li, H. and J. E. Braun, "Virtual Refrigerant Pressure Sensors for Use in Monitoring and Fault Diagnosis of Vapor-Compression Equipment." HVAC&R Research, 2009b, 15(3): 597-616.

Liu, M., "Variable Speed Drive Volumetric Tracking (VSDVT) for Airflow Control in Variable Air Volume (VAV) Systems." Journal of Solar Energy Engineering, 2002, 125(3): 318-323.

Prieto, A. R., L. Song and G. Wang, Uncertainty Studies of Airflow Measurements in Non-Ideal Conditions in Variable Air Volume Air Handling Units. 2016 ASHRAE Annual Conference, 2016, St. Louis, MO, American Society of Heating, Refrigerating and Air-Conditioning Engineers.

Prieto, A. R., W. M. Thomas, G. Wang and L. Song (2017). "In-situ Fan Curve Calibration for Virtual Airflow Sensor Implementation in VAV Systems." ASHRAE Transactions, 2017, 123(1): 215-229.

Robotics, P. "Wireless data logging, monitoring and control systems." from http://paragonrobotics.com/. 2017.

Shahahmadi, S. and L. Song, "Valve flow meter enhancement through computing valve dynamic behaviors." ASHRAE Transactions, 2017.

Song, L., I. Joo and G. Wang, "Uncertainty Analysis of a Virtual Water Flow Measurement in Building Energy Consumption Monitoring." HVAC&R Research, 2012, 18(5): 997-1010.

Song, L., A. Swamy, G. Shim and G. Wang, Feasibility Study of Developing a Virtual Chilled Water Flow Meter at Air Handling Unit Level. Proceedings of International Conference of Enhanced Building Operation, 2011, New York City.

Song, L., G. Wang and M. Brambley, Uncertainty propagation in device characteristic based virtual sensors. ASHRAE Annual Conference, Dallas, TX American Society of Heating, Refrigerating and Air-Conditioning Engineers, 2013a.

Song, L., G. Wang and M. Brambley, "Uncertainty analysis for a virtual valve flow meter at an air handling unit." HVAC&R Research, 2013b, 19(3): 335-345.

Song, L., G. Wang, A. Swamy and G. Shim, In-situ resistance coefficient and experimental analysis of a virtual chilled water flow meter at air handling unit level. Proceedings of ASME 2012 International Mechanical Engineering Congress and Exposition, 2012, Houston TX.

Swamy, A., L. Song and G. Wang, "A Virtual Chilled-Water Flow Meter Development at Air Handling Unit Level." ASHRAE Transactions, 2012, 118(2): 1013-1020.

Wang, G., K. Kiamehr and L. Song, "Development of a Virtual Pump Water Flow Meter with an Explicit Expression of Motor Power and Pump Head." Energy and Buildings, 2016, 117: 63-70.

Wang, G. and M. Liu, Development of Power-head based fan airflow station. Proceedings of International Conference for Enhanced Building Operations 2005, 2005, Pittsburgh, Pennsylvania.

Wang, G., L. Song, E. Andiroglu and G. Shim, "Investigations on a Virtual Airflow Meter using Projected Motor and Fan Efficiencies." HVAC&R Research, 2014, 20(2): 1-10.

Wang, G., L. Song and S.W. Park, "Estimation of induction motor circuit parameters and efficiency under variable frequencies." ASHRAE Transactions, 2013, 119: 118.

Wichman, A. and J. E. Braun, "A smart mixed-air temperature sensor." HVAC&R Research, 2009, 15(1): 101-115.

Yu, D., H. Li and Y. Yu, "Virtual calibration of a supply air temperature sensor in rooftop air conditioning units." HVAC&R Research, 2011, 17(1): 31-50.

Rivas Prieto, Alejandro L., Uncertainty Analysis for In-Situ Fan Curve Calibration in Variable Air Volume Systems, 2016.

* cited by examiner

FLOW DEVICE AND CONTROL SYSTEM AND METHODS FOR HVAC SYSTEM MONITORING

INCORPORATION BY REFERENCE OF RELATED APPLICATIONS

The present patent application claims priority to the provisional patent application identified by U.S. Ser. No. 62/612,011, filed on Dec. 29, 2017, titled "Flow Device and Control System and Methods for HVAC System Monitoring"; and U.S. Ser. No. 62/615,754, filed on Jan. 10, 2018, titled "Flow Device and Control System and Method for HVAC System Monitoring", the entire content of both patent applications being expressly incorporated herein by reference.

STATEMENT REGARDING FEDERALLY SPONSORED RESEARCH AND DEVELOPMENT

This invention was made with government support under Contract Number W912HQ-C-0050 awarded by the Department of Defense. The government has certain rights in the invention.

BACKGROUND

Precision data collection may aid in controlling and optimizing operations of heating, ventilation and air conditioning (HVAC) systems. Additionally, existing industrial standards, e.g., ASHRAE standards 62.1 and 90.1, ask for detailed advanced energy efficient operations. Airflow and water flow rates may be key to controlling variables of HVAC systems and precision data collection of such may aid in optimizing operations of HVAC systems. For example, a lower supply airflow rate may cause poor indoor ventilation, while a higher supply airflow rate may cause excessive use of fan power and reheat energy. For a variable chilled water loop, a lower water flow rate may damage chillers while a higher water flow rate may cause an excessive use of pump power.

Airflow and water flow rates may also be indices for evaluating energy performance of HVAC systems. Flow rates may be used to measure actual energy use and project the reference (fault-free) energy use based on energy balance and/or mechanism of subsystems. For example, actual energy uses of cooling coils can be measured by water flow rate and at the same time the reference value (fault-free) of energy usage can be also projected by airflow rates based on energy balance. Deviations between actual and reference energy uses may be indicators of faults and/or inefficient operations. Consequently, the lack of flow measurements may lead to inadequate energy performance evaluation indices for HVAC system operations. Efforts to commission buildings and improve energy performance may be similarly limited without building automation system (BAS)-embedded metering capacities. Today, energy efficiency measurements may require professionals to travel to each facility with portable meters.

To obtain data on flow rates, various sensors may be placed throughout a building system and provide measured values to a central control computer. There are many types of sensors that may be utilized. However, the implementation of some sensors may be less practical than others. For example, temperature sensors may be relatively easy to implement and connect to the system. Flow rate sensors, on the other hand, can prove to be less practical and efficient, as the mere presence of some flow sensors within a duct/pipe may disrupt the flow itself, yielding potentially unfavorable data. In addition to high meter and installation costs, physical meter installations may require long, straight and unobstructed pipes or ducts, equivalent to 7.5 diameters upstream and 3 diameters downstream of physical flow meters for proper measurements. Space limitations plus expensive installation costs are a few of the dominant factors discouraging physical flow meter installations in existing buildings.

Equipment device characteristic-based virtual air/water flow meters provide a promising solution to these challenges. The use of virtual meters was first explored for HVAC in 2003, when a virtual fan airflow station was developed for measuring both supply air and return air volumetric flow rate for controlling the return airflow rate based on tracking supply airflow rate. The system used fan head, fan speed and the fan curve to determine the total airflow rate without the need for direct physical measurements. In 2004, a fuzzy sensor was developed for determining the average temperature of air leaving the mixing-box of an air-handling unit (AHU). This virtual sensor corrected measurements from conventional mixed-air temperature sensors. The system used a fuzzy relationship between the measured temperature from the conventional sensor and the average mixed-air temperature determined through computational dynamic simulations of the mixing chamber. However, the application of virtual meters has not been massively adopted by the industry for many reasons.

First, the application of virtual meters has not been adopted due to the lack of appropriate equipment models. The flow rate is indirectly calculated using the equipment characteristic models and a few other particular variables, however, the accuracy of the virtual flow meters may be highly dependent on the accuracy of such models. Although the conventional flow calculating models may be available in engineering textbooks, the models for this application need to be formed for easy implementation, and further, the parameters in the models may need to be easily and accurately obtained in a simple calibration process.

Second, the application of virtual meters has not been adopted due to complex calibration procedures that may be difficult to apply in the field. The accuracy of equipment characteristic models may heavily depend on the parameters identified in the calibration procedure. Such accuracy may require a highly skilled person to conduct the calibration increasing costs of implementation.

The accuracy of a virtual flow meter may depend on correct calibration of the virtual meters to obtain valve, fan and pump characteristic curve measurements.

The virtual valve flow meter was initially developed in the prior art using the steady-state concept, in which valve commands may be used to represent valve positions in virtual flow calculations in order to obtain the average hourly cooling energy used in an air-handling unit for fault detection and diagnosis purposes. In that system, an assumption was made that the valve oscillated over a short time period, and using hourly average data could eliminate the difference between hourly-averaged valve commands and valve positions. However, using hourly-averaged data may have shortcomings. The valve command signal does not always represent the physical positioning of the valve accurately, especially when a valve experiences a slow opening or closing, but not oscillations. For example, when the measured flow rate experiences a big change over a short time period, the virtual flow may follow the measured flow well. However, when the measured flow remains relatively constant, virtual flow may experience drastic reductions. The reductions in the virtual flow calculations may be the result of the valve commands experiencing the same slowly descending patterns. The measured flow reflects the actual valve position. This disagreement may indicate that the slow valve command changes do not affect the valve's actual movement.

The sources of this phenomenon may be both intentional and unintentional. For example, there may be a certain deadband value set within the system, which indicates to the valve that it cannot change direction until the change in the valve command exceeds such given value. This may be intentionally implemented in order to protect the system from small, rapid oscillations causing rapid wear. An unintentional source of this phenomenon, however, may be friction. Outside of the deadband, if the change in the command signal is small enough, the valve actuators may not provide enough force for the valve to overcome static friction and start moving. The term 'stiction' has been used to define this phenomenon, in which the valve is 'stuck' due to static friction. When this phenomenon occurs, valve command data cannot always be used as valve positions to formulate the virtual valve flow meter. Previous systems related to valve stiction have taken empirical approaches, while other have relied on simulation results or physical models.

The virtual fan/pump flow meter was initially developed in the prior air using fan head, power and speed measurements. To save the cost of installing a power meter, the VFD power signal that is freely available in a VFD control panel, is used as the motor input power for the fan airflow and pump water flow calculations. The power signal provided by the VFD panel is known insufficiently accurate in the prior art which results in up to 15% accuracy loss in flow rate calculations.

Currently, there are no available flow meters that may be easily installed for air measurements. Currently available portable velocity measurement probes (e.g., pitot-tube or hot-wire), are typically hand-held for one-time measurements.

As such, a need exists in the prior art to provide a system and method for improvement of flow devices within HVAC systems, their use and calibration thereof.

BRIEF DESCRIPTION OF THE DRAWINGS

Several embodiments of the present disclosure are hereby illustrated in the appended drawings. It is to be noted however, that the appended drawings only illustrate several embodiments and are therefore not intended to be considered limiting of the scope of the present disclosure.

DETAILED DESCRIPTION

Figure 1:
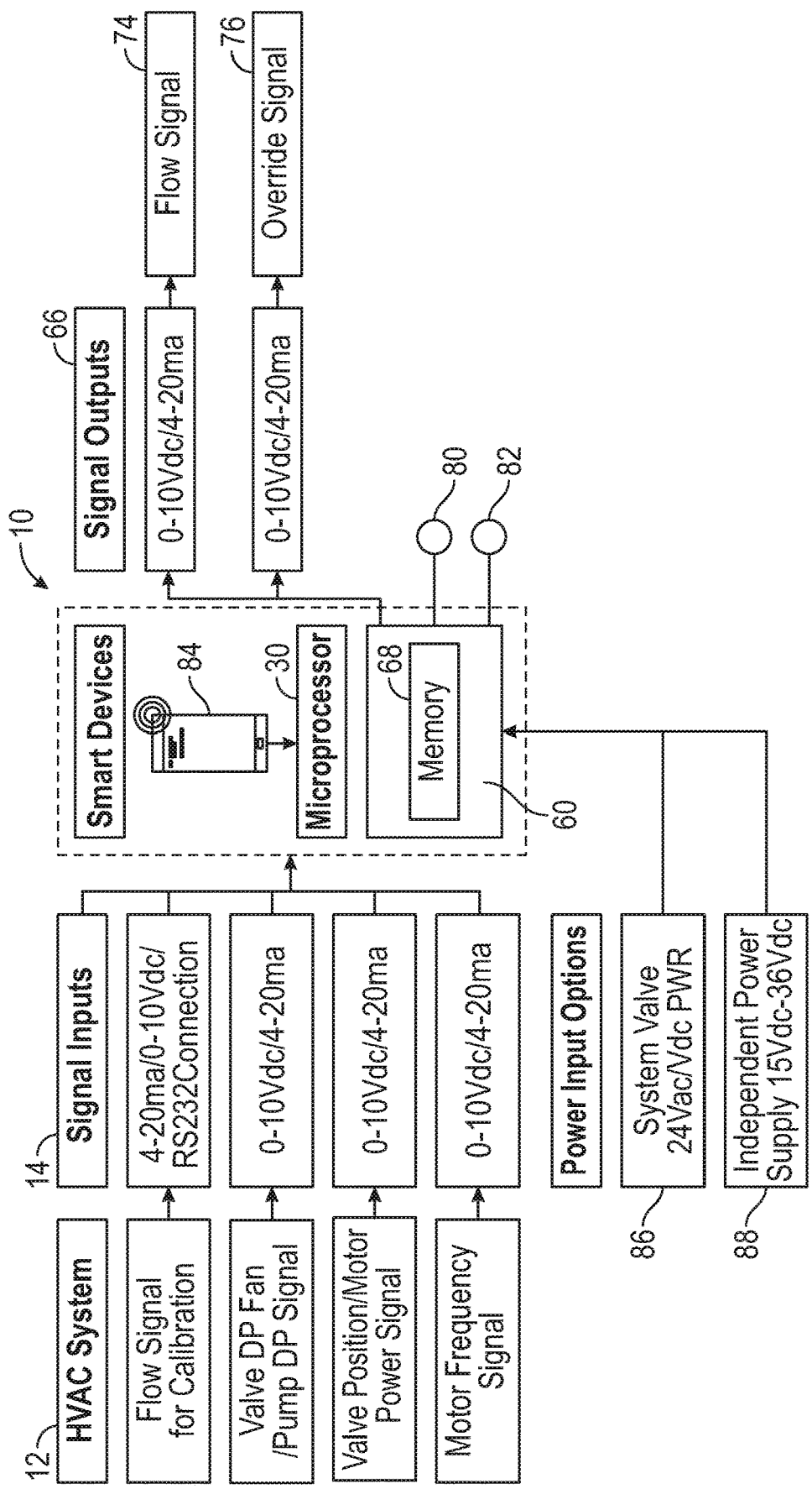
FIG. 1 is a block diagram of an exemplary embodiment of a flow device for use in a heating, ventilation and air conditioning (HVAC) system in accordance with the present disclosure.

Embodiments of the present disclosure are directed to a flow device system and one or more methods configured to aid in calibration of the flow device system. In some embodiments, the flow device system can determine water flow rate through a control valve (i.e., valve water flow meter (VWM)), airflow rate through a fan (i.e., fan airflow meter (FAM)), and/or water flow rate through a pump (i.e., pump water flow meter (PWM)). In some embodiments, the flow device system may include or be configured for simultaneous use of each of the three meters (i.e., VWM, FAM and PWM), two meters, and/or single meter depending on the application needs. For example, on an air handling unit (AHU) providing centralized cooling and heating air to a building, the VWM and FAM may both be embedded to monitor operation of the AHU. Thus, the flow device system may solely include VWM and FAM meters or include each of the three meters (i.e., VWM, FAM and PWM) and be configured for a particular application using only the VWM and FAM meters in this example.

In some embodiments, configuration of the flow device system may include identification of valve position and/or alteration of valve position using valve commands based on empirically-obtained stiction and/or deadband data. In some embodiments, an application relating to identification and/or alteration of valve position may be programmed into a building automation system (BAS).

In some embodiments, configuration of the flow device system may include determination of flow rate of water through a valve in an air-handling unit using differential pressure across the valve and associated coil, valve command, and an empirically-determined steady-state valve characteristic curve. In some embodiments, valve dynamic behavior may be empirically described using valve stiction and stiction plus deadband to convert valve commands to actual valve positions. In some embodiments, valve reaction time may be used to provide parameters for stiction and deadband parameters.

In some embodiments, a holding bracket may be used within the flow device system to temporarily measure airflow rate for an extended time (e.g., two hours).

Before describing various embodiments of the embodiments of the present disclosure in more detail by way of exemplary description, examples, and results, it is to be understood that the embodiments of the present disclosure are not limited in application to the details of methods and compositions as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the presently disclosed inventive concepts may be practiced without these specific details. In other instances, features which are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which embodiments of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

While the compositions and methods of the embodiments of the present disclosure have been described in terms of particular embodiments, it will be apparent to those of skill in the art that variations may be applied to the compositions and/or methods and in the steps or in the sequence of steps of the method described herein without departing from the spirit and scope of the inventive concepts. All such similar substitutes and modifications apparent to those of skilled in the art are deemed to be within the spirit and scope of the inventive concepts as defined herein.

As utilized in accordance with the methods and compositions of the embodiments of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" or "approximately" is used to indicate that a value includes the inherent variation of error. Further, in this detailed description, each numerical value (e.g., time or frequency) should be read once as modified by the term "about" (unless already expressly so modified), and then read again as not so modified unless otherwise indicated in context. The use of the term "about" or "approximately" may mean a range including ±1%, or ±5%, or ±10%, or ±15%, or ±25% of the subsequent number unless otherwise stated.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), and application specific integrated circuit (ASIC), field programmable gate array (FPGA), a combination of hardware and software, and/or the like. The term "processor" as used herein means a single processor or multiple processors working independently or together to collectively perform a task.

As used herein, the term "stiction" is defined as static friction resistance to valve movement.

As used herein, the term "deadband" refers to hysteresis involved in reversal of valve movement directions.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

Referring to the Figures, and in particular FIG. 1, shown therein is a flow device system 10 for monitoring of one or more heating, ventilation and air conditioning (HVAC) systems 12 in accordance with the present disclosure. The flow device system 10 may be configured to receive one or more input signals 14 and conduct one or more calibrations to determine one or more parameters for continuous flowrate determination and associated applications (e.g., fan fault detection, deficiency alterations) for the HVAC system 12 and/or additional associated systems.

Figure 2:
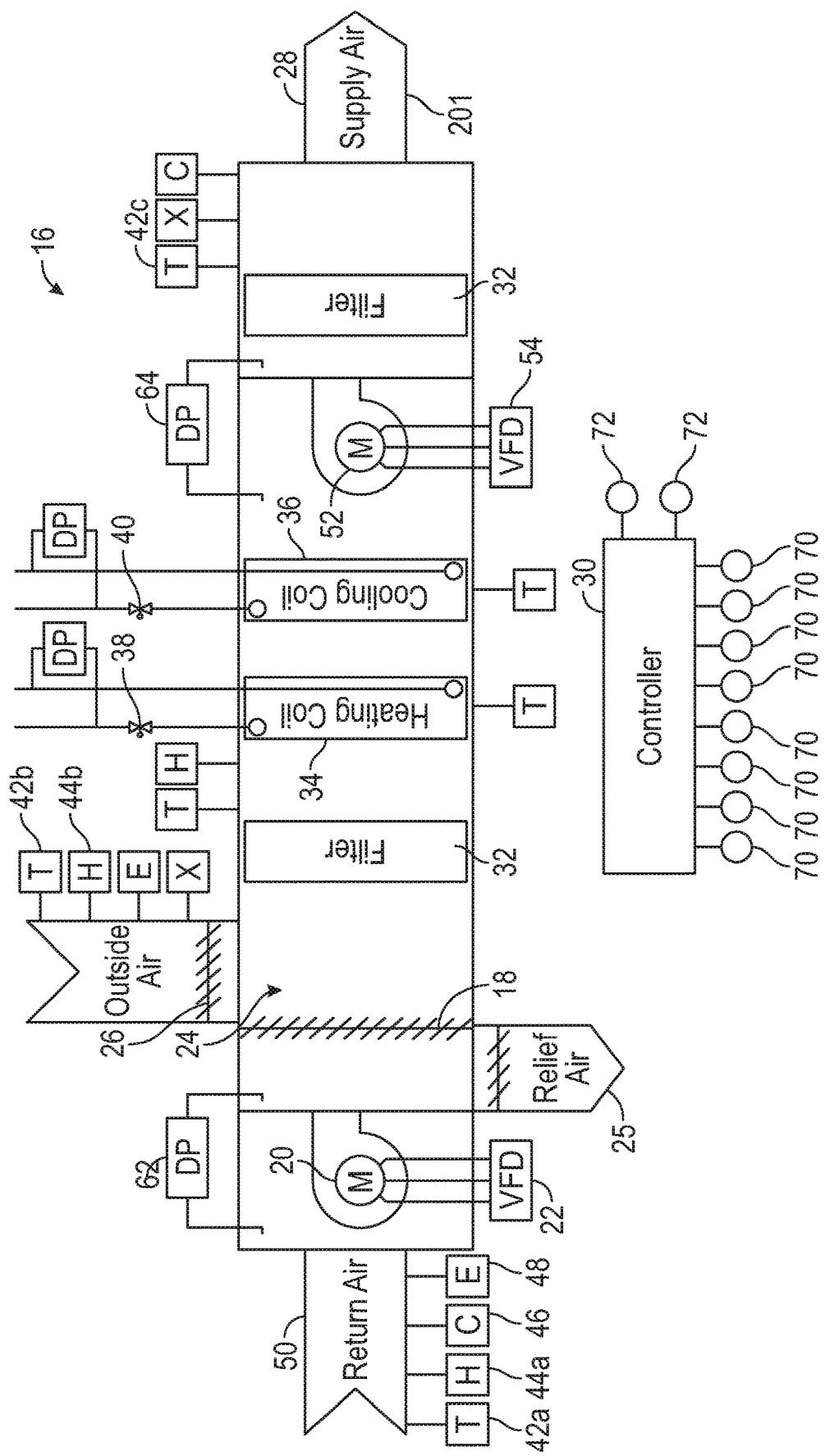
FIG. 2 is a block diagram of an air handler unit (AHU) of the HVAC system illustrated in FIG. 1 having an exemplary controller of the flow device configured to obtained measurements and provide signals to one or more elements of the AHU in accordance with the present disclosure.

Referring to FIG. 1 and FIG. 2, the HVAC system 12 generally includes an air handler unit (AHU) 16 configured to control the environment of a room and/or building. The AHU 16 may be used to regulate and/or circulate air. Generally, air may be drawn into a return damper 18 via a return fan 20 having a first motor 22. In some embodiments, the first motor 22 may be an electric motor and may operate at a single speed, a variety of set speed, or be driven by a variable frequency drive having variable sped capabilities as illustrated in FIG. 2. The air may pass through the return fan 20 and into a mixing chamber 24. The mixing chamber 24 may allow for the introduction of outside air and/or releasing of air from a relief air duct 25. Air flows through the mixing chamber 24 to a supply air duct 28. The dampers 18 and 26 may be opened and closed by one or more actuators. The actuators may be operated by a controller 30 (See FIG. 1).

As shown in FIG. 2, the air may encounter one or more filters 32. Filters 32 may be low-MERV pleated media, HEPA, electrostatic, and/or the like. For example, a first filter 32 may be used to remove impurities or solid particles from downstream components. A second filter 32 may be used to remove impurities prior to air leaving the AHU 16.

One or more heating elements and/or cooling elements may provide heating and/or cooling to alter the air temperature and/or humidity. The AHU 16 shown in FIG. 2 includes heating element 34 and cooling element 36, however, it should be noted that the AHU 16 may include one or both of heating elements 34 and cooling elements 36, and may also include additional heating elements 34 and/or cooling elements 36.

The controller 30 may operate valves 38 and 40 configured to regulate flow of fluid through the heating element 34 and cooling element 36 depending on whether air needs to be cooled or heated. The valve 38 for the heating element 34 may be controlled to modulate flow of hot water, steam, and/or electricity to a heating coil to maintain temperature at a setpoint.

Sensors 42, 44, 46 and 48 may measure parameters related to air and provide signals to the controller 30. For example, sensor 42a and 44a measure temperature and humidity of air in a return duct 50. Sensors 42b and 44b measure temperature and humidity of outside air. Sensor 42c measures temperature of air heading and/or in the supply air duct 28. In some embodiments, additional sensors 42, 44, 46 and 48 may be positioned throughout the AHU 16 and/or within the environment of the air.

Subsequent to temperature control and/or alteration, the air may be supplied to a supply fan 52 having a second motor 54 for pushing air into the supply air duct 28. The second motor 54 may be an electric motor and may operate at a single speed, a variety of set speed, or be driven by a variable frequency drive having variable sped capabilities as illustrated in FIG. 2.

Referring to FIGS. 1 and 2, the controller 30 may by a component or components that are able to embody and/or execute the logic of the processes described herein. Logic embodied in the form of software instructions and/or firmware may be executed on appropriate hardware. For example, logic embodied in the form of software instructions or firmware may be executed on a computer system, a distributed processing system, and/or the like. In some embodiments, the logic may be implemented in a stand-alone environment operating on a single processor, and/or logic may be implemented in a networked environment, such as a distributed system using multiple processors. To that end, one or more elements of logic embodied in the form of software instructions or firmware may be executed in a stand-alone environment and one or more elements of the logic may executed in the distributed system.

The controller 30 may include one or more processors 60 configured to communicate with at least the sensors 42, 44, 46 and 48, the motors 22 and 54, the valves 38 and 40, and one or more pressure sensors 62 and 64 to receive inputs signals 14 from the HVAC system 12 and provide one or more signal outputs 66 as described herein. The one or more processors 60 may work together, or independently to execute processor executable code. Additionally, the controller 30 may include one or more memory 68 capable of storing processor executable code. In some embodiments, each element of the controller 30 may be partially or completely network-based or cloud-based, and may or may not be located in a single physical location.

Exemplary embodiments of the processor 60 may include, but are not limited to, a digital signal processor (DSP), a central processing unit (CPU), a field programmable gate array (FPGA), a microprocessor, a multi-core processor, and/or combinations thereof, for example. The one or more processors may be capable of communicating via a network (e.g., analog, digital, optical and/or the like in some embodiments. The one or more processors 60 may include one or more input ports 70 (e.g., physical or virtual ports) capable of receiving data (e.g., receiving data from one or more sensors 42, 44, 46 and/or 48, motors 22 and/or 54, pressure sensors 62 and/or 64, and/or the like). Additionally, the one or more processors 60 may include one or more output ports 72 (e.g., physical or virtual ports) capable of transmitting data to one or more elements of the AHU 16 (e.g., FLOW signal 74 or OVERRIDE signal 76). The one or more processors 60 may be capable of reading and/or executing processor executable code and/or capable of creating, manipulating, retrieving, altering and/or storing data structure into one or more memories (e.g., memory 68).

In some embodiments, the one or more memories 68 may be located in the same physical location as the one or more processors 60. Alternatively, the one or more memories 68 may be implements as a cloud memory (i.e., one or more memories may be partially or completely based on or accessed using a network, for example).

The one or more memories 68 may store processor executable code and/or information comprising one or more database and program logic. For example, the database hosted by the processor 60 may store data indicative of temperature, humidity, pressure and/or the like.

In some embodiments, the controller 30 may include one or more input devices 80 and one or more output devices 82. The one or more input devices 80 may be capable of receiving information directly from a user, processor and/or environment and transmit such information to the one or more processors 60. The one or more input devices 80 may include, but are not limited to, implementation as a keyboard, touchscreen, mouse, trackball, microphone, fingerprint reader, infrared port, cell phone, PDA, controller, network interface, speech recognition, gesture recognition, eye tracking, brain-computer interface, combination thereof, and/or the like.

The one or more output devices 82 may be capable of outputting information in a form perceivable by a user and/or processor(s). In some embodiments, the one or more output devices 82 may be configured to output information automatically (i.e., without human intervention). For example, in some embodiments, the one or more output devices 82 may be capable of printing or displaying at a pre-determined time interval an accounting of sensor parameters, valve control, power parameters, and/or the like. The one or more output devices 82 may include, but are not limited to, implementation as a computer monitor, a screen, a touchscreen, a speaker, a website, a television set, an augmented reality system, a smart phone, a PDA, a cell phone, a fax machine, a printer, a laptop computer, an optical head-mounted display, combinations thereof, and/or the like.

In some embodiments, the controller 30 may communicate with one or more user systems 84. The user system 84 may be implemented as a smartphone, a tablet, a laptop computer, a personal computer, a desktop computer, a computer terminal, a computer workstation, a wireless network capable handheld device, a personal digital assistant, and/or the like. The user system 84 may include one or more processors, one or more transitory processor readable medium, an input device, and an output device. The processor, the one or more non-transitory processor readable medium, the input device and the output device of the user system 84 may be implemented similarly to the elements of the controller 30. The user system 84 may be configured to interface with the controller 30 via a wired or wireless network.

The user system 84 may store processor executable instructions or a software application. For example, the user system 84 may include a web browser and/or native software application running on the user system 84 and configured to communicate with the controller 30 over a network. The software application on the user system 84 may be configured to access a website and/or communicate information and/or data with the controller 30 over the network. In some embodiments, the user system 84 may include an application program (e.g., specialized program downloaded onto the user system 84), and communicate with the controller 30 via the network through the application. In some embodiments, the user system 84 may receive one or more notifications from the controller 30 (e.g., fan fault detection, cooling deficiency).

Referring to FIGS. 1 and 2, in some embodiments, power to the flow device system 10 may be obtained via the HVAC system 12. In one example, power to the flow device system 10 may breach power supplied elements 86 of the HVAC system 12 (e.g., actuators) already receiving power. To that end, no additional power supply may be needed to power the flow device system 10. Additionally, as input signals for the flow device system 10 may be located solely on the AHU 16, the flow device system 10 may be positioned on the body of the AHU 16 and/or within less than 2-foot wire distance of the AHU 16. In some embodiments, the controller 30 may be positioned in a housing having one or more attachment means to attach the controller 30 to the body of the AHU 16. Attachment means may include, but are not limited to, magnetic (electromagnets, permanent magnets, temporary magnets), adhesive (dry adhesive, artificial gecko material), suction/vacuum (vacuum pads, hovering), and/or mechanical (clamps, brackets). In some embodiments, the flow device system 10 may use an independent power supply 88, such as an alternating current power supply, a battery and combinations thereof. In some embodiments, the flow device system 10 may use a combination of power supplied to elements 86 of the HVAC system 12 and the independent power supply 88.

The flow device system 10 may determine one or more valve, fan and pump characteristic models. The valve characteristic models may be used to precisely and conveniently determine fluid flow rate (e.g., water flow rate) through a control valve (i.e., valve water flow meter (VWM)), and the fan, pump and motor characteristic models may be used to determine airflow rate through a fan (i.e., fan airflow meter (FAM)), and/or water flow rate through a pump (i.e., pump water flow meter (PWM)). In some embodiments, the characteristic models may be used to alter positions of the valves (i.e., open valve or close valve) and speeds of the fans and pumps (i.e., speeding up and slowing down the fans and pumps). The flow device system 10 may use alteration of valve position to increase or decrease flow rate, for example.

Determining Water Flow Rate Through a Control Valve

Figure 3:
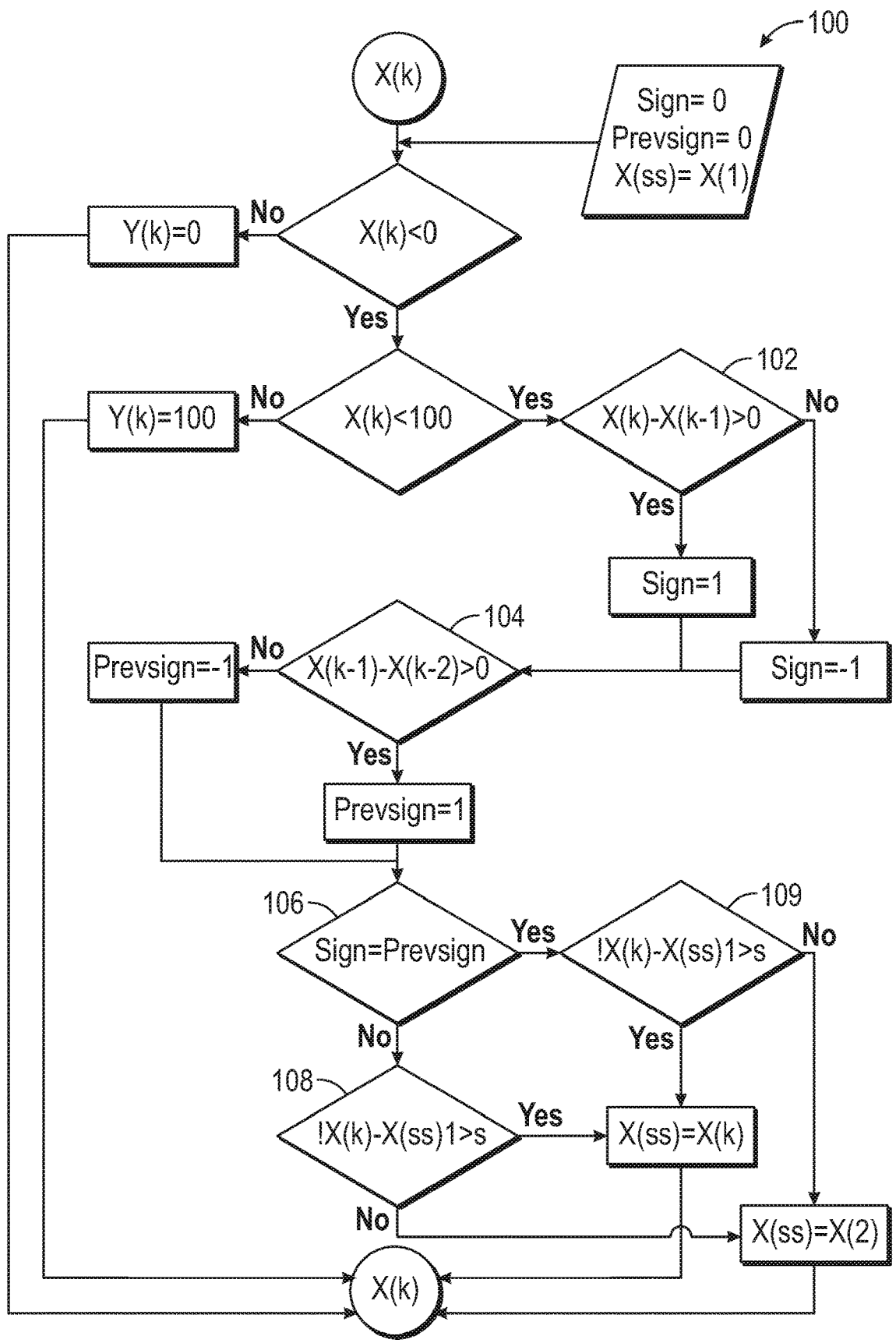
FIG. 3 is a flow diagram of valve commands provided by the controller to one or more elements of the AHU illustrated in FIG. 2 in accordance with the present disclosure.

In some embodiments, valve positions may be altered based on valve commands that take into account empirically-obtained stiction and deadband data from the flow device system 10. FIG. 3 illustrates a flow chart 100 of valve commands in accordance with the present disclosure. In some embodiments, the valve commands may be programmed into a building automation system (BAS). In some embodiments, the controller 30 may communicate valve commands via a wireless network. In some embodiments, the controller 30 may communicate valve commands via a wired network.

The current valve command provided by the controller 30 is denoted X(k) in the flow chart 100 in FIG. 3. The valve command changes if the valve is opened or closed. Slope (Sign) may determine whether the valve command changed. To determine Slope (Sign) as shown in step 102, the current valve command signal X(k) may be compared first to the prior valve command signal X(k−1). The slope function output may be defined as +1 if the slope is positive (i.e., valve is opening), and −1 if the slope is negative (i.e., valve is closing). To determine change in slope, previous slopes may be determined as shown in step 104 to provide previous slope (PresSign). The slope (Sign) and previous slope (Slope) may be compared as shown in step 106. Any change in the slope may denote an instance wherein the direction of the valve changes (e.g., opening or closing).

At each instance, the valve command X(k) may be compared with the previous stuck position (shown as X(ss) in FIG. 3). Once the difference between the valve command X(k) becomes greater than a pre-determined threshold, the valve may skip and start moving. The slip threshold may be one of two values, valve stiction (S) and stiction plus deadband (J), and may depend on whether the valve experiences a change in direction.

If the valve reverses direction in that the slope (Sign) changes from +1 to −1 or from −1 to +1, the slip threshold may be equal to slip jump (J) of the valve as indicated in step 108. With the valve reversing directions, the cumulative changes in the command signal compared with X(ss) have overcome deadband plus stiction (J).

If the valve still maintains the same direction, the slip threshold may be equal to the stiction (S) as shown in step 109. For example, movement of the valve comes to a rest and again starts in the same direction (i.e., without reversing directions), the cumulative changes in the command signal X(k) compared with X(ss) may overcome stiction (S) before the valve begins movements again. The direction of slope (Sign) of the valve command X(k) at the moment of valve sticking may be compared with slope of the valve command X(k) at every moment while the valve is stuck.

If the slope (Sign) is +1 at the moment of sticking, then any change in the slope to −1 while the valve is stuck sets the threshold from stiction (S) threshold to deadband plus stiction (J) threshold. The slip threshold may only be set to the stiction (S) threshold if the valve does not reverse direction from stuck to slipping. The newly calculated valve position may remain the same while the valve is stuck and change again when the valve slips and starts moving.

To determine parameters for stiction (S) and deadband plus stiction (J), additional measurements within the AHU 16 may be obtained including reaction time of valves. To determine which values to use for stiction (S) and deadband plus stiction (J), incremental changes may be made manually via override signals 76 (e.g., valve command and fan speed command) provided by the controller 30 as actual position of the valve may be monitored for changes.

In some embodiments, the override signal 76 may provide alterations of the valve in the same direction and in the reverse direction. Additionally, in some embodiments, multiple ranges of positioning the valve may be used such that threshold for stiction (S) and deadband plus stiction (J) may be determined to be constant throughout a particular range of valve movements.

Figure 4A:
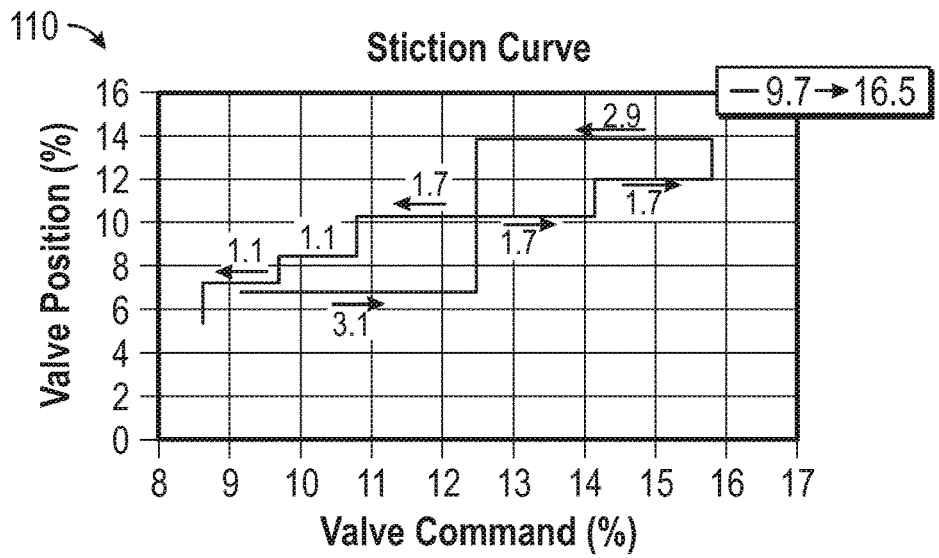
FIG. 4A illustrates an exemplary stiction curve determined at valve commands in a range between 8% to 16%, using methods described in accordance with the present disclosure.
Figure 4B:
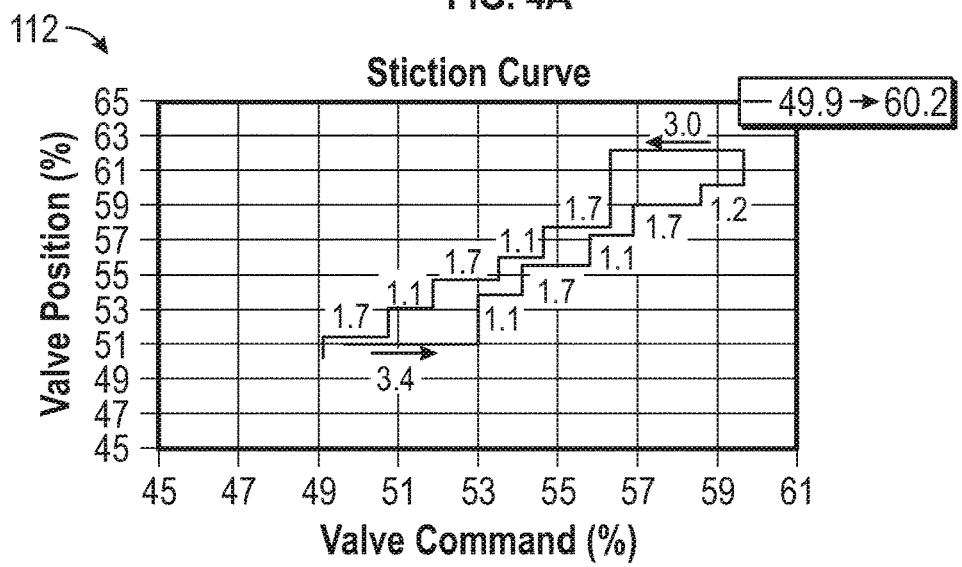
FIG. 4B illustrates an exemplary stiction curve determined at valve commands in a range between 49% to 61%, using methods described in accordance with the present disclosure.
Figure 4C:
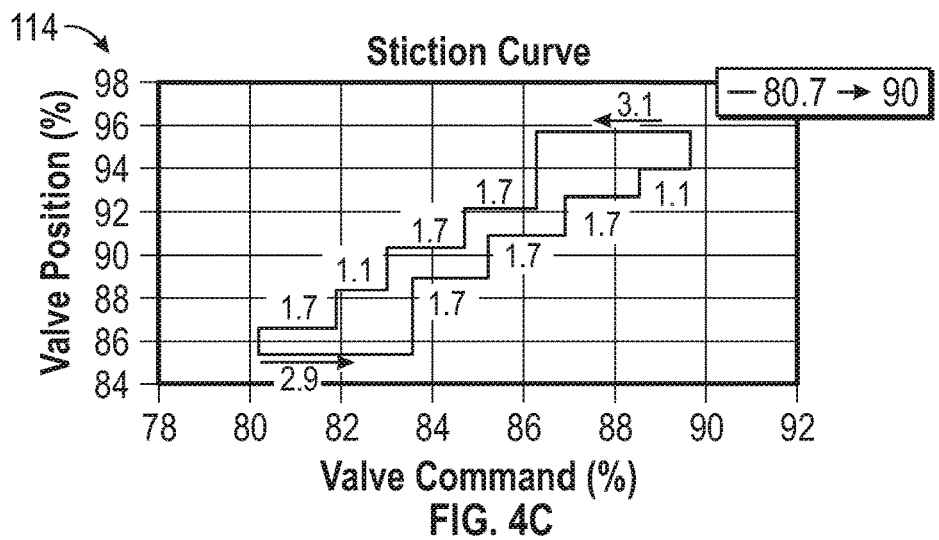
FIG. 4C illustrates an exemplary stiction curve determined at valve commands in a range between 80% to 90%, using methods described in accordance with the present disclosure.

Valve position signals and valve command signals may be monitored as override signals 76 may be provided to the valve altering positioning of the valve. In some embodiments, monitoring may occur over several ranges (e.g., 10%-20% low range, 50%-60% medium range, 90%-100% high range, and/or the like). For each range, incremental changes in valve commands may be introduced by the override signal 76 provided by the controller 30. The process may include increasing valve commands and/or decreasing valve commands. For example, a series of 0.1 percentage point incremental increases in valve command may be introduced. Within pre-determined time intervals (e.g., 30 seconds), valve positions may be monitored and tracked to provide stiction curves 110, 112, and 114 as illustrated in FIGS. 4A-4C. Additionally, 0.1 percentage point incremental decreases in valve position may be monitored and tracked (i.e., reverse order). The stiction curve may be used to compare valve commands versus actual valve position. For example, in FIG. 4A there are initially no significant changes in valve position. The valve position stays the same (at about 6.5%), while the valve command increases from 10% to 12.5%. Different values between valve commands and positions may imply magnitude bias in measurements. Different values for the same command may be generated by an internal signal converter used in a valve actuator and BAS system. Such bias may also be detected as improved valve command and positions are compared. As valve command exceeded 12.5%, a significant increase may be seen in valve position in FIG. 4A. Valve position increased from 6.5% to slightly above 10%. Following the increase in valve position, which may be a result of increase in valve command, the process was reversed, and the valve command was reduced incrementally. Upon the reduction in valve command, the valve position increased. The valve command continued to decline. As it declined from about 15.75% to 12.5%., the valve position remained intact (at about 14%). When the valve command went back to 12.5%, the valve position declined to 10%. This remained the same until the valve command was lowered to 10.75%, when the valve position dropped to slightly above 8%. The averaged thresholds with and without a direction change were 1.7% to 3.0%, respectively.

Referring to FIG. 4B, the second range included valve commands between 50% and 60% (medium range). Similar to the pattern that emerged for low range valve commands in FIG. 4A, the valve position increased under medium range conditions when incremental increases in valve command were introduced, and the magnitude of those changes was in a similar range to the changes that occurred in the low range. This was also the case when changes in valve commands were reversed.

Figure 5:
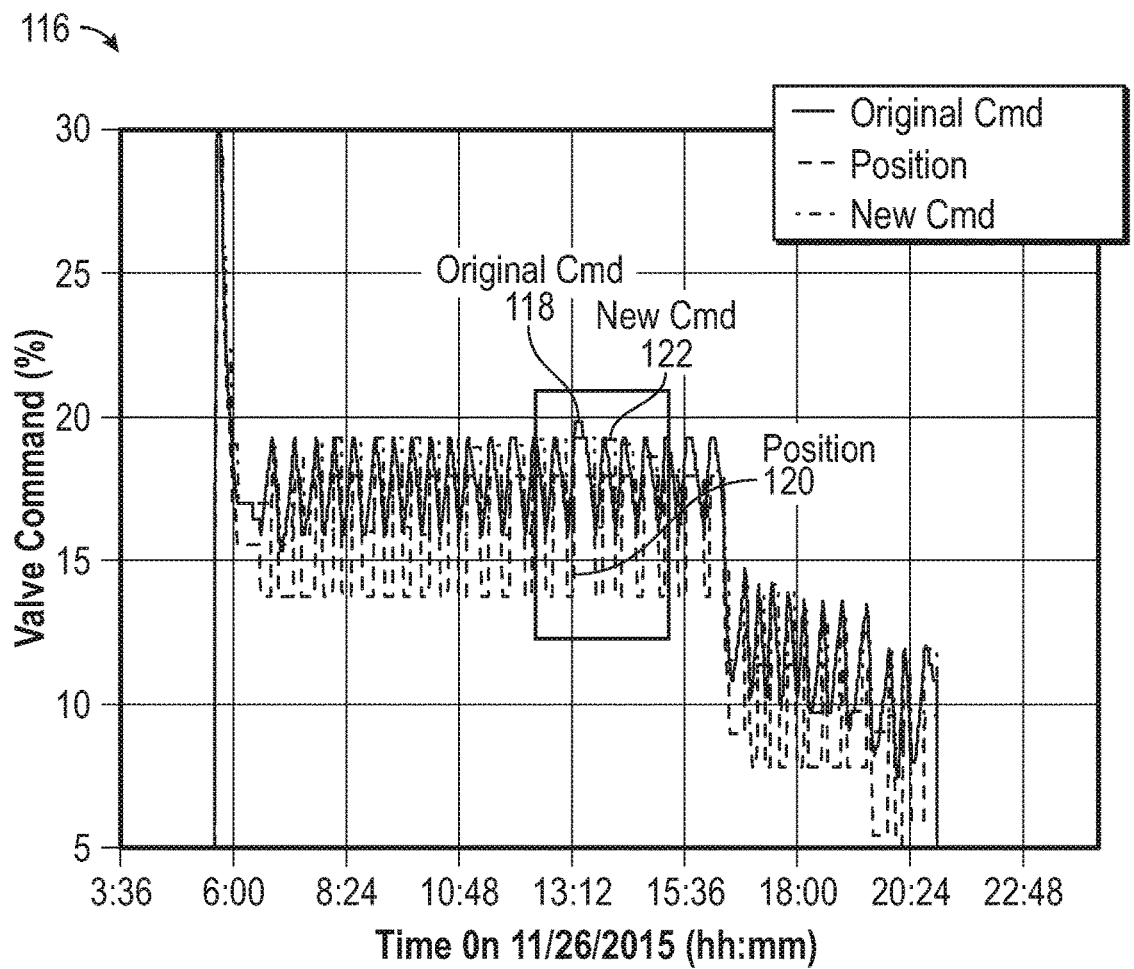
FIG. 5 illustrates a graph comparing valve commands and related positioning of a valve.

Referring to FIG. 4C, the third range included valve commands between 90% and 100% (high range). The emerging pattern was similar to low and medium range variations. The magnitude of changes was comparable to the low range case and to the medium range case. Therefore, the average S and J from all three range cases may be used to validate the flow chart presented in FIG. 3 and shown in FIG. 5. As shown in the graph 116 illustrated in FIG. 5, the original valve command 118 and actual valve position 120 include error. Using the new valve command 122 that incorporates stiction (S) and stiction plus deadband (J), the corrected value command may be closer to the actual valve position.

Figure 6:
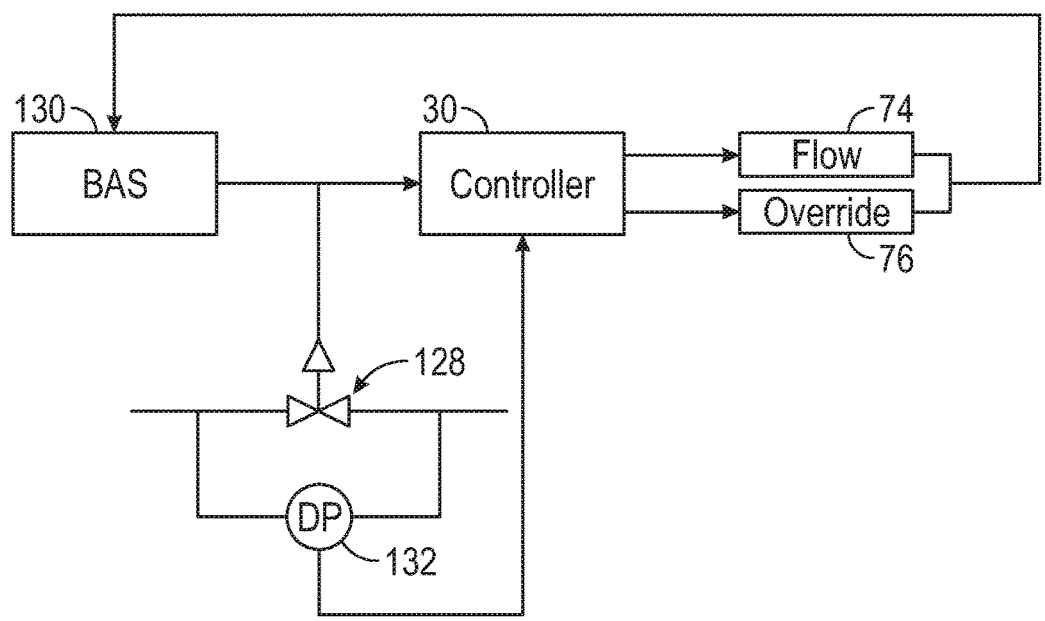
FIG. 6 illustrates a block diagram of an exemplary control valve and controller configured to determine water flow rate through the control valve in accordance with the present disclosure.
Figure 7:
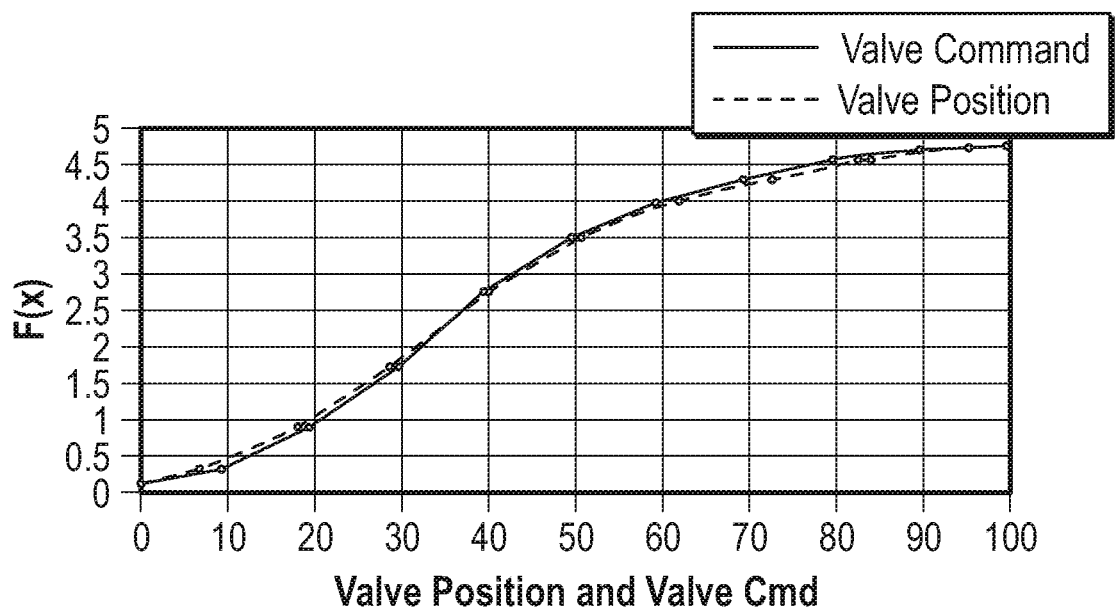
FIG. 7 illustrates a graphical representation of valve characteristic curve based on valve commands and valve positioning for a control valve in accordance with the present disclosure.

Referring to FIGS. 6 and 7, the controller 30 may determine water flow rate through a control valve 128 by sending signals 74 and 76 to the building automation system (BAS) system 130 to alter control of the control valve 128 and measure related parameters. The water flow rate through a control valve 128 may be calculated using the differential pressure via a pressure sensor(s) 132 across the control valve 128, position of the control valve 128 (e.g., open, closed), and a valve characteristic curve, as shown in Equation 1:

$$Q_z = f_v(x)\sqrt{\Delta P_v} \qquad (EQ.\ 1)$$

wherein $f_v(x)$ is installed valve characteristic at a valve position x; and $\Delta P_v$ is the differential pressure across the control valve 128.

In order to determine the virtual water flow rate, shown in Equation 1, a valve characteristic curve may be obtained via a calibration process. The determination of the valve characteristic curve is shown in Equation 2:

$$f(x) = \frac{Q}{\sqrt{\Delta P_V}} \qquad (EQ.2)$$

with measured water flow (Q) and differential pressure across the control valve 128 ($\Delta P_v$) at different valve positions, and the values for f(x) at different valve positions. The f(x) curve may be obtained by overriding the valve command x at every 10% interval starting from 0% opening to 100% opening. In some embodiments, the control valve 128 may be kept at the same position for a pre-determined amount of time (e.g., 15 minutes) for each position in order to eliminate the first two transient points at each interval. Measured water flow rate (Q) and differential pressure ($\Delta P_v$) at each valve position may be recorded and averaged after removing transient points. Then, correlation between computed values of f(x) and valve position data may be regressed (e.g., using a sixth order polynomial equation). The regressed f(x) may be a valve characteristic curve for steady-state valve operations. An exemplary valve characteristic curve is shown in FIG. 7.

Figure 8:
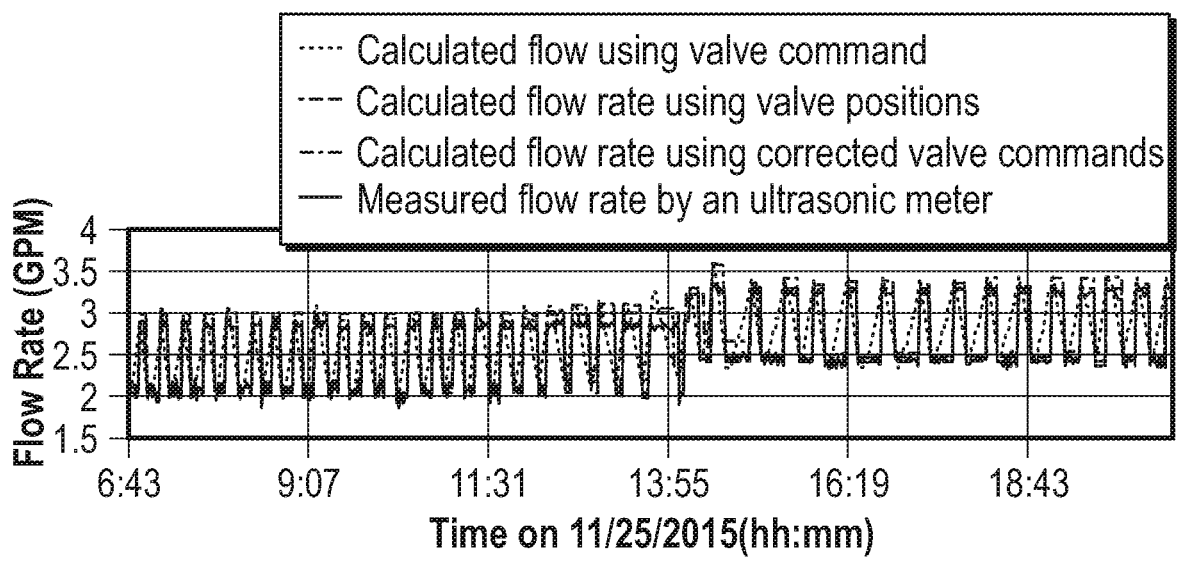
FIG. 8 illustrates a graphical representation of flow rate obtained by measured meter readings and flow rate determined by valve commands and associated corrected commands in accordance with the present disclosure.

Referring to FIGS. 7 and 8, employing the empirical coefficients obtained in FIG. 7, a virtual water flow may be determined. FIG. 8 compares the flow rate obtained by measured meter reading and flow rate determined by the valve commands and corrected commands and valve position. The differences between the calibrated flows using commands, corrected commands, position and the actual flows recorded by the ultrasonic meter may be determined.

To even further evaluate performance of different flow calculations, multiple sets of errors may be compared. The absolute error between measured flow ($V_U$), measured by a physical meter, and the calculated flow ($V_C$) determined using the corrected valve command, may be determined for a first set of errors ($Error_1$). Absolute error between the measured flow ($V_U$) and the calculated flow using the valve original command ($V_O$) (i.e., not corrected) may be determined for a second set of errors ($Error_2$). Absolute error between the measured flow ($V_U$) and valve position flow ($V_P$) may be determined for a third set of errors ($Error_3$). The mean and standard deviation of the above errors may be determined. The standard deviation is computed in the following fashion in Equation 3:

$$SD_K = \sqrt{\frac{\sum_{i=1}^{N}(Error_{K,i}\overline{Error_K})^2}{N-1}} \; ; K = \{1, 2, 3\} \qquad (EQ.\ 3)$$

wherein K is either equal to 1, 2, or 3 (for $Error_1$, $Error_2$, and $Error_3$, respectively), i represents the ith observation in the sample, and N is the sample size.

Alternatively, errors may be compared in relative terms. For example:

$$\text{Relative Error}_1 = \frac{|V_U - V_C|}{V_U} \qquad (EQ.\ 4)$$

$$\text{Relative Error}_2 = \frac{|V_U - V_O|}{V_U} \qquad (EQ.\ 5)$$

$$\text{Relative Error}_3 = \frac{|V_U - V_P|}{V_U} \qquad (EQ.\ 6)$$

where VU, VC, VO, and VP are defined as above. Further, the error magnitude over the full range of the flow rate may be determined, and the errors compared with design flow rate of cooling element 36. Errors may be defined:

$$\text{Normalized Error Over Design Flowratae}_1 = \frac{|V_U - V_C|}{V_d} \qquad (EQ.\ 7)$$

$$\text{Normalized Error Over Design Flowratae}_2 = \frac{|V_U - V_O|}{V_d} \qquad (EQ.\ 8)$$

$$\text{Normalized Error Over Design Flowratae}_3 = \frac{|V_U - V_P|}{V_d} \qquad (EQ.\ 9)$$

wherein $V_U$, $V_C$, $V_O$, and $V_P$ are defined as above, and the denominator ($V_d$) is the design flow rate. Using error determinations, calculated flow may be further evaluated.

Figure 9:
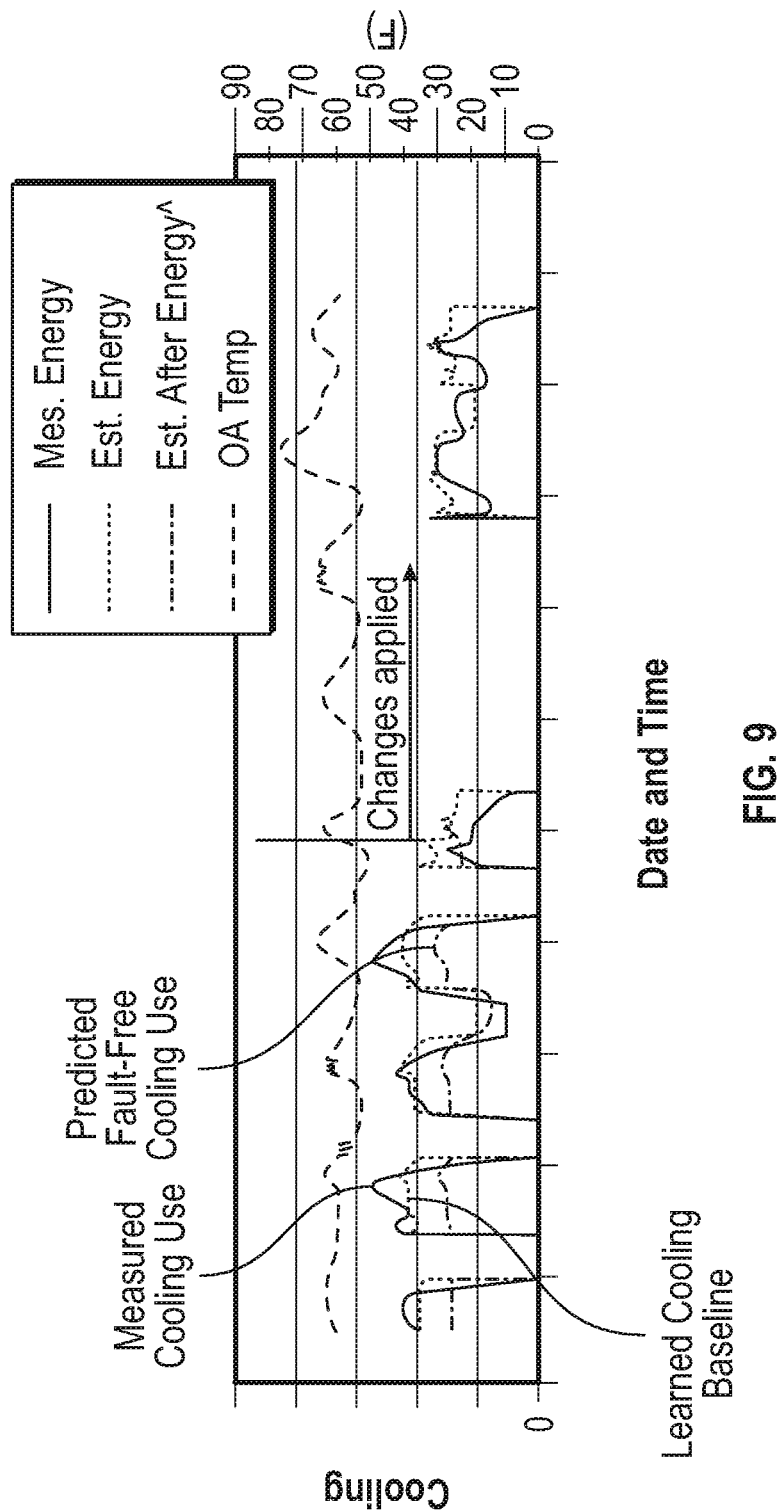
FIG. 9 illustrates a graphical representation of deviations between actual and reference energy uses within a coil.

Referring to FIGS. 2, 8 and 9, as shown above, by using empirical coefficients obtained from the valve characteristic curve, virtual water flow may be determined. In some embodiments, using virtual water flow, actual energy use of cooling element 36 may be measured. In some embodiments, one or more reference values (e.g., fault free reference value(s)) of energy usage for the cooling element 36 may be determined using virtual water flow. Deviations between actual and reference energy uses may provide one or more indicators of faults or inefficient operations. To that end, one or more threshold values for one or more faults and/or inefficient operations may be stored in the controller 30. The controller 30 may provide one or more communications to the user system 84 upon meeting or exceeding such threshold values, for example.

Determining Flow Rate Through a Pump or Fan

In some embodiments, virtual flow rate may be determined using fan and/or pump performance characteristics. One or more motor characteristic models may be used to precisely and conveniently determine air and/or water flow rate with less than 5% relative error at low flow rates (e.g., 2 gallon/per minute) and 2% relative error at high flow rates. In some embodiments, motor power and frequency inputs to the controller 30 may be obtained directly from the motors 22, 54 and/or pump motor. Water/air flow rate caused by the motors 22,54 and/or pump motor may be determined using motor input power, pump/fan head, motor and fan efficiencies as shown in Equation 10:

$$Q = \frac{W_{motor} \cdot \eta_{motor} \cdot \eta_{fan/pump}}{H} \quad \text{(EQ. 10)}$$

wherein Q is the flow rate of water/air, $n_{fan/pump}$ is pump efficiency, $\eta_{motor}$ is motor efficiency, $W_{motor}$ is motor input power, and H is the pump/fan head. In some embodiments, to save cost and time in installing a power meter, the power signal of the motor/pump may be used. The motor/pump power signal is generally available in the motor/pump control panel and may be used to identify input power for determination of water/air flow rate.

Referring to FIGS. 1 and 2, the motor power is known within the industry for inaccurate readings leading to 10% to 15% errors in calculated water/air flow rate. A motor efficiency calibration algorithm (e.g., a regression model) may be used to determine additional efficiency losses of the motors 22, 54 and/or pump introduced by motor harmonics to calculate the motor efficiency. Calibration algorithms may obtain in-situ valve, fan/pump curves for determining the flow rate. Generally, the flow device system 10 may use the override signal 76 to automate one or more operations on the HVAC system 12 such as motors 22 and 54, pump motor and/or the like to obtain a full range of operations similar to the methods described herein in relation to the control valve 128. The measured values obtained via in-situ flow reading may be compared with calculated values for calibration and a characteristic model developed for each valve, fan and/or pump.

The motors efficiency model may be regressed as a function of the VFD output frequency. The motor efficiency function may be tested and recorded using flow device system 10 by overriding the VFD output frequency through the override signal 76 from 60 HZ to a minimum frequency (normally 15 HZ). Overrides may be completed in a reasonably short period of time so that the HVAC system does not experience significant operation changes. The VFD output power or motor input power ($W_{motor}$) is recorded from the VFD power output at each frequency (f). The determination of the motor efficiency function is shown in Equation 11.

$$\eta_{motor}(f) = \frac{\left(\frac{f}{60}\right)^3 W_{motor@60Hz}}{W_{motor@fHz}} \quad \text{(EQ. 11)}$$

Then, the fan/pump efficiency function may be tested and recorded using the flow device system 10 with the calibrated motor efficiency function under normal operation routine. The VFD output power or motor input power ($W_{motor}$), the differential pressure across the fan/pump (H) and the VFD output frequency (f) and the air/water flow rate (Q) are recorded. The determination of the fan/pump efficiency function is shown in Equation 12.

$$\eta_{fan/pump}\left(\frac{W}{H^{1.5}}\right) = \frac{QH}{W_{motor} \cdot \eta_{motor}(f)} \quad \text{(EQ. 12)}$$

wherein the fan/pump shaft power is:

$$W = W_{motor} \cdot \eta_{motor}(f) \quad \text{(EQ. 13)}$$

Flow Measurement to Calibrate Fan Flow Meters

Referring to FIGS. 2 and 10-13, in some embodiments, a portable physical flow meter 200 may be used within the flow device system 10 to obtain in-situ flow rate measurements for air within a duct 201, such as the supply air duct 28. Generally, the portable physical flow meter 200 may be configured for measurement of velocity rate over an extended period of time (e.g., time period for calibration data collection). The portable physical flow meter 200 may include a holding bracket 202 configured to support one or more velocity measuring probes 204 for an extended period of time within the duct 201. In some embodiments, the holding bracket 202 may be configured to position the one or more measuring probes 204 in a fixed relationship relative to a duct within the AHU 16. A hole having a diameter greater than the diameter of the measuring probe 204 may be machined within an exterior wall 203 (See FIG. 13A) the duct 201 of the AHU 16 and the holding bracket 202 may secure the measuring probe 204 within the hole such that a portion of the measuring probe 204 is positioned within the duct 201 and a portion of the measuring probe 204 is positioned outside of the duct 201 with the measuring probe 204 extending through the hole in the exterior wall 203 of the duct 201.

The holding bracket 202 may include a probe holder 206, an outwardly extending flange 208, and at least two duct grippers 210. The probe holder 206 may have a sidewall in a form of an elongated tube extending from a first end 212 of the probe holder 206 to a second end 214 of the probe holder 206. The elongated tube may have a hollow interior configured to house one or more measuring probes 204 during use. While the probe holder 206 is illustrated as a cylindrical tube, it should be noted that the elongated tube may be any shape configured to house one or more measuring probes 204 and is not limited to having a cylindrical shape.

Figure 10:
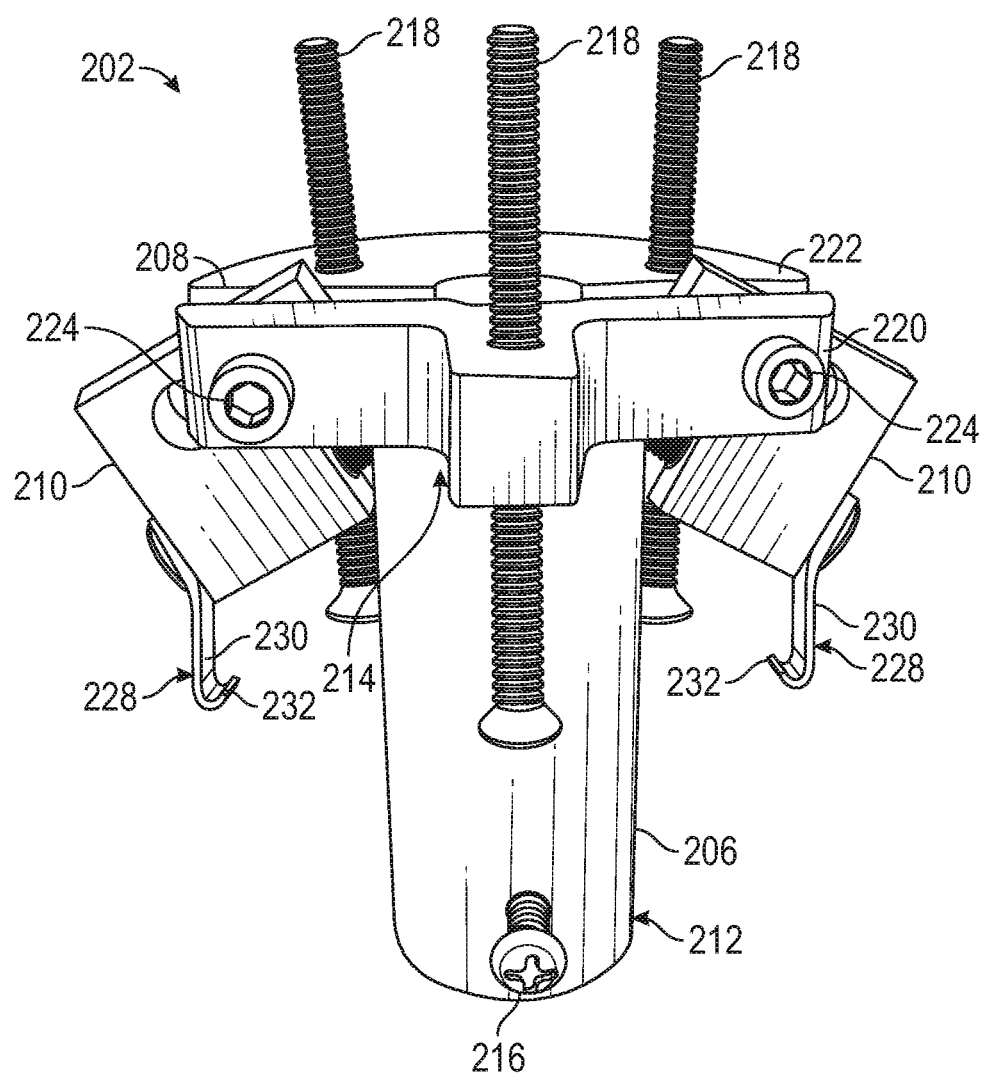
FIG. 10 illustrates a perspective view of a holding bracket in accordance with the present disclosure.
Figure 11:
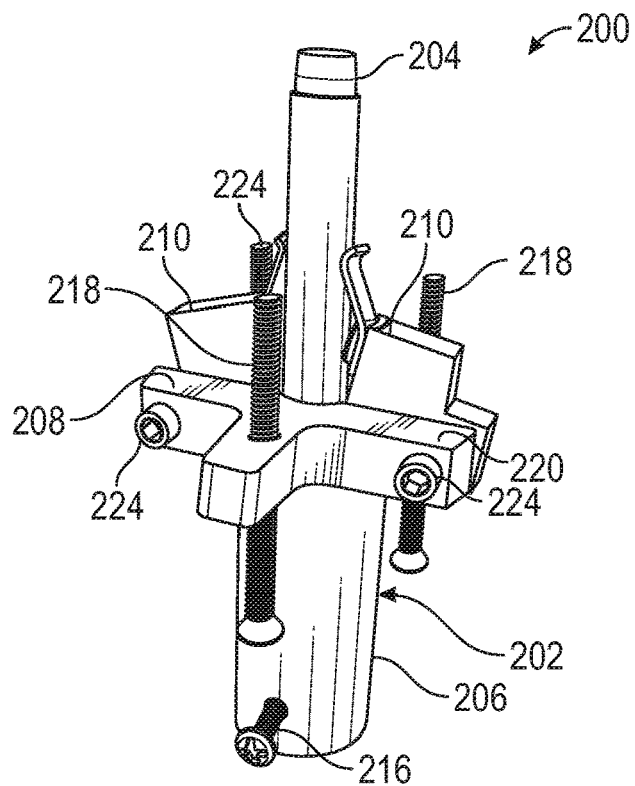
FIG. 11 illustrates a perspective view of portable physical flow meter including the holding bracket illustrated in FIG. 10 and a measuring probe.
Figure 12:
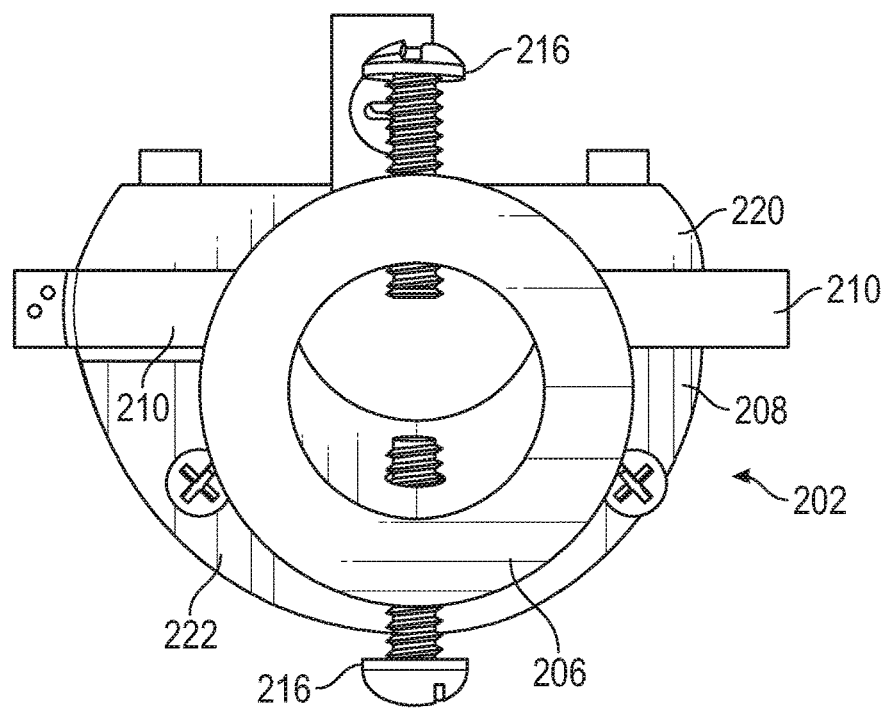
FIG. 12 illustrates a top down view of the holding bracket illustrated in FIG. 10.

The first end 212 of the probe holder 206 may include one or more probe clamps 216 configured to secure one or more measuring probes 204 within the probe holder 206. The position of the one or more probe clamps 216, can be adjusted to adjust the position of the one or more measuring probes 204 relative to the exterior wall 203 of the duct 201. For example, in some embodiments, the one or more probe clamps 216 may secure the one or more measuring probes 204 within the probe holder 206 such that the measuring probes 204 are positioned normal relative to the exterior wall 203 of the duct 201 when the measuring probe 204 is inserted into the duct 201. In FIG. 12, the first end 212 of the probe holder 206 includes two probe clamps 216 by way of example; however, any number of probe clamps 216 may be used in accordance with the present disclosure. For example, four probe clamps 216 may secure the one or more measuring probes 204 within the probe holder 206 and aid in adjusting the one or more measuring probes 204 relative to the duct 201. While the exemplary embodiment illustrated in FIGS. 10-12 show probe clamps 216 as screws, it should be noted that probe clamps 216 may include, but are not limited to screws, braces, bands, clasps, and/or the like.

The outwardly extending flange 208 may be connected to and adjacent to the second end 214 of the probe holder 206. In some embodiments, the outwardly extending flange 208 may include a plurality of securing clamps 218. The securing clamps 218 may be configured to be adjustably positioned against the exterior wall 203 of the duct 201 exerting force against the exterior wall 203 such that the probe holder 206 may be secured relative to the exterior wall 203 of the duct 201 and lock the duct grippers 210 against the exterior wall 203 of the duct 201 for positioning and maintaining the measuring probe 204 within the exterior wall 203 of the duct 201 in a secure position. FIG. 10 illustrates the use of three securing clamps 218; however, any number of securing clamps 218 may be used.

The outwardly extending flange 208 may include a first block 220 and a second block 222 with securing pins 224 adjustably securing the first block 220 to the second block 222. The duct grippers 210 are positioned between the first block 220 and the second block 222. Each securing pin 224 traverses from the first block 220 through the duct gripper 210 to the second block 222. Referring to FIGS. 10, 11 and 13B the securing pin 224 additionally may permit rotational and lateral movement of the duct grippers 210 via an elongated slot 226 positioned in each duct gripper 210. The securing pin 224 may traverse through the elongated slot 226 such that the duct gripper 210 may rotate about the securing pin 224 between the first block 220 and the second block 222. The elongated slot 226 may permit lateral movement of the duct grippers 210 to provide for measuring probes 204 having different cross-sectional sizes.

Figure 13A:
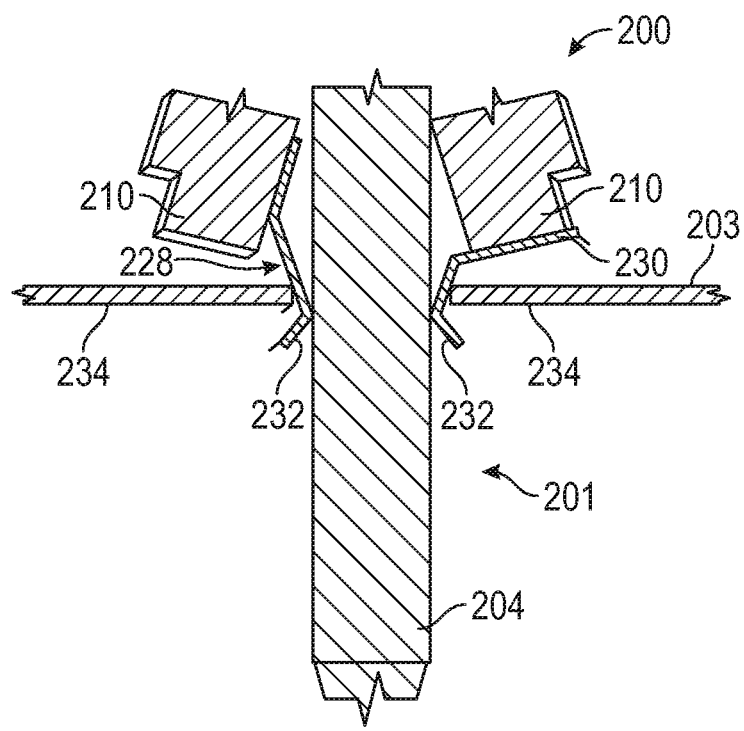
FIG. 13A illustrates a cut-away view of duct grippers of the holding bracket illustrated in FIG. 10 positioned within an exterior wall of a duct.
Figure 13B:
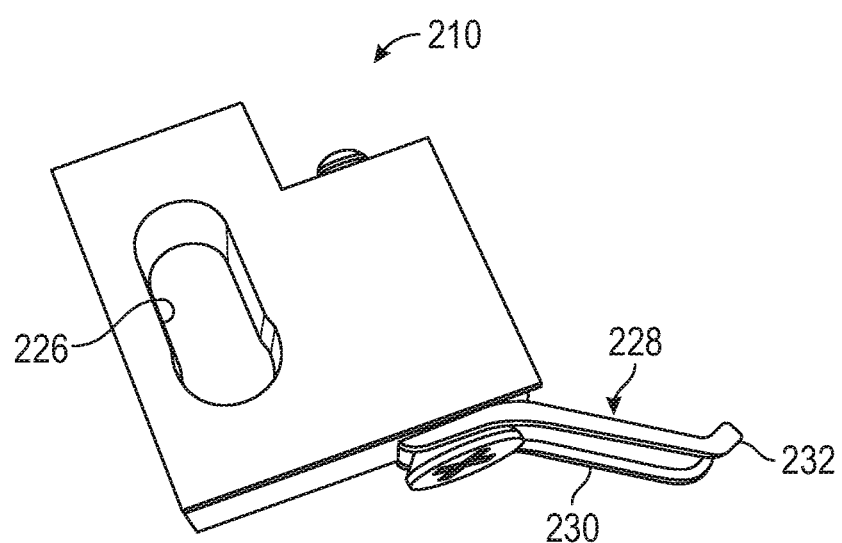
FIG. 13B is a perspective view of a duct gripper for use in the holding bracket of FIG. 10 in accordance with the present disclosure.

Referring to FIGS. 13A and 13B, each duct gripper 210 includes a support block 227 having the elongated slot 226, and may also include one or more fingers 228 extending from the support block 227. The support block 227 and the one or more fingers 228 may be constructed separately and connected together, or formed as a unitary structure. The finger 228 may be adjustably secured to the support block 227 and include an elongated bar 230 and a curved end 232. During use, the elongated bar 230 and the curved end 232 of the finger 228 may be positioned within the duct 201 such that the finger 228 may grip an interior surface 234 of the exterior wall 203 securing the probe holder 206 to the exterior wall 203 of the duct 201.

During use of the portable physical flow meter 200, a hole may be machined (e.g., drilled) into the exterior wall 203 of the duct 201. The hole may have a diameter greater than the cross-sectional size (e.g., diameter) of the measuring probe (s) 204. The holding bracket 202 may be secured to the exterior wall 203. To that end, the duct grippers 210 may be rotated such that the fingers 228 are positioned adjacent to each other. The fingers 228 may be positioned within the hole within the exterior wall 203 of the duct 201. The measuring probe 204 may then be positioned within the probe holder 206 of the holding bracket 202 and extend from the outwardly extending flange 208. The measuring probe 204 may be forced between the fingers 228 of the duct gripper 210 such that the fingers 228 grip the interior surface of the exterior wall 203. The securing clamps 218 may be adjusted such that each securing clamp 218 exerts force on the exterior wall 203 of the duct 201. The probe clamps 216 may also be secured such that the measuring probe 204 is angled (e.g., normal) relative to the exterior wall 203 of the duct 201.

FIGS. 14-18 illustrate another exemplary embodiment of a portable physical flow meter 300 that may be used within the flow device system 10 to obtain in-situ flow rate measurements for air within the duct 201, such as the supply air duct 28. Generally, the portable physical flow meter 300 may be configured for measurement of velocity rate over an extended period of time (e.g., time period for calibration data collection). The portable physical flow meter 300 may include a holding bracket 302. The holding bracket 302 may be formed of a housing 304 and a threaded plug 306 having a plurality of spring loaded duct grippers 308. A plurality of alignment thumbscrews 310 may be positioned through the thread engagement housing 304, and against the measuring probe 204 to allow for continuous contact (e.g., three-point contact) with the measuring probe 204 regardless of angle change.

Figure 15:
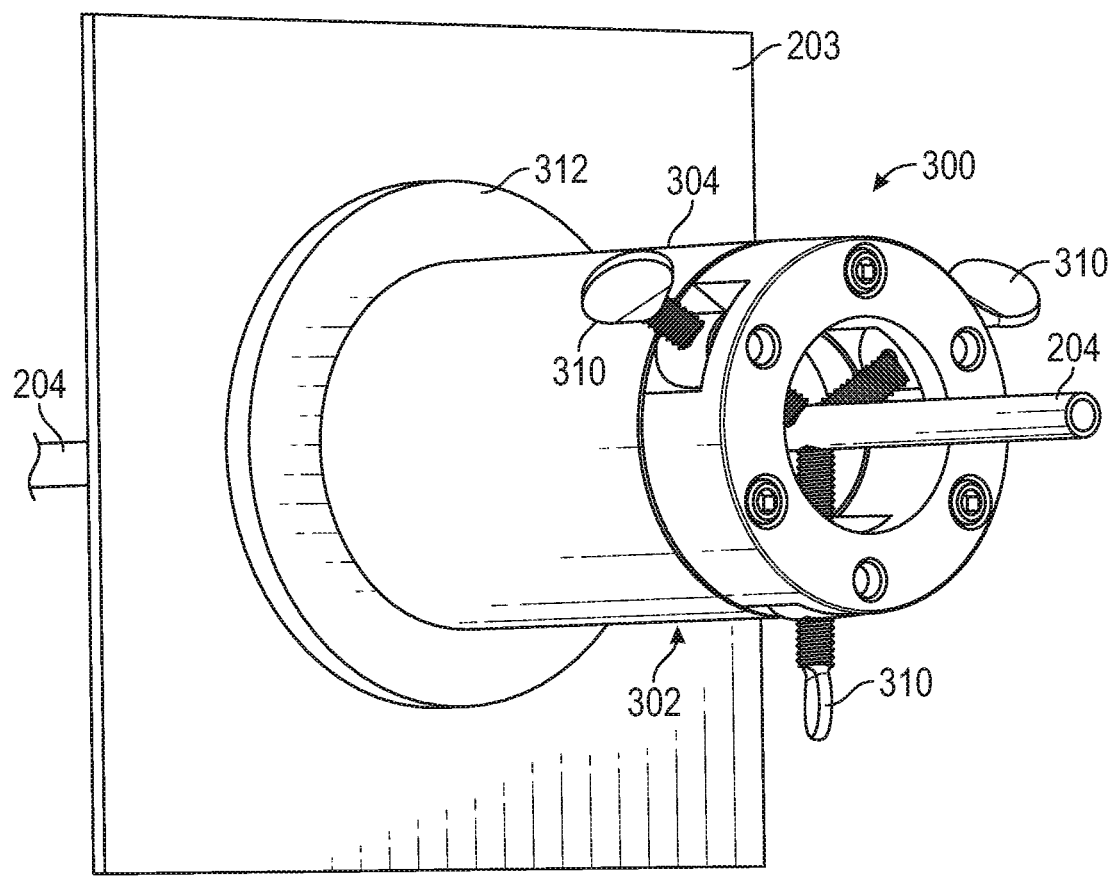
FIG. 15 illustrates a perspective view of the portable physical flow meter of FIG. 14 secured to an exterior wall of a duct.
Figure 16:
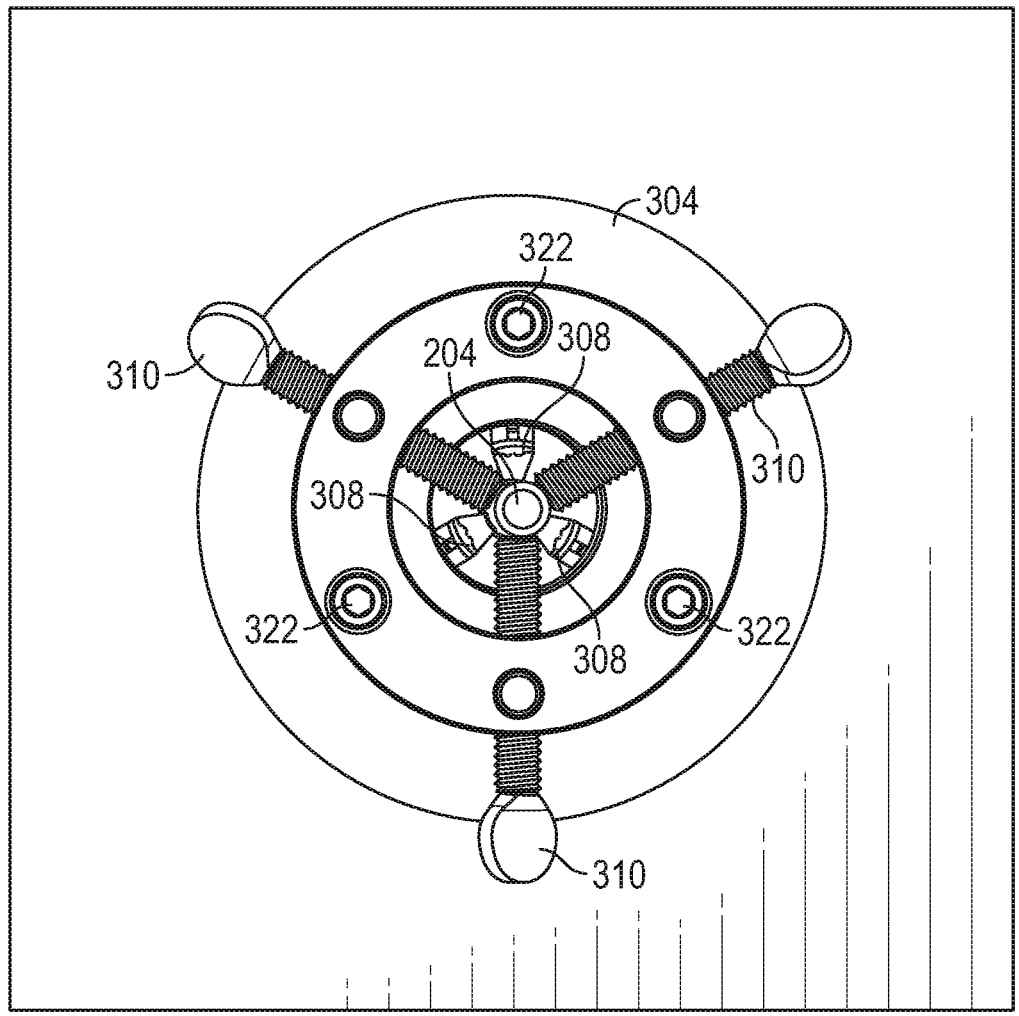
FIG. 16 illustrates a top down view of the portable physical flow meter of FIG. 14.

The holding bracket 302 may be configured to support one or more velocity measuring probes 204 for an extended period of time within the duct 201. The holding bracket 302 may also be configured to position the one or more measuring probes 204 in a fixed relationship relative to the duct 201 within the AHU. A hole having a diameter greater than the diameter of the measuring probe 204 may be machined within the exterior wall 203 of the duct 201, and the holding bracket 302 may secure the measuring probe 204 within the hole such that at least a portion of the measuring probe 204 is positioned within the duct 201 as shown in FIG. 15.

In some embodiments, a thrust washer 312 may be placed between the holding bracket 302 and the exterior wall 203 of the duct 201. The thrust washer 312 may allow the holding bracket 302 to rotate without scoring the exterior wall 203 of the duct 201.

Figure 14:
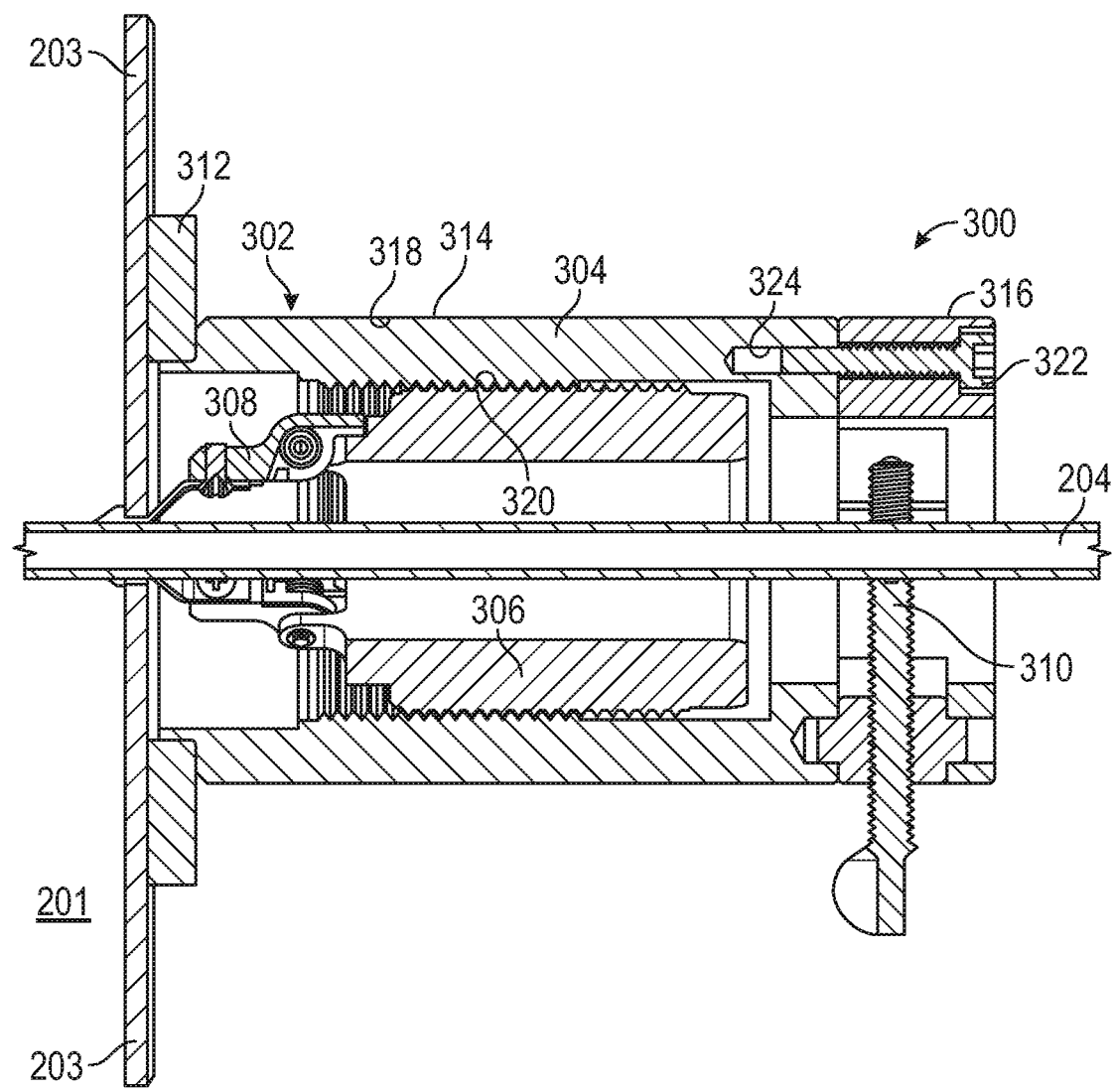
FIG. 14 illustrates a cut-away view of another exemplary portable physical flow meter including a holding bracket in accordance with the present disclosure

The housing 304 of the holding bracket 302 may be tubular shaped, and include a first end 313 engaging the thrust washer 312, a threaded portion 314 and an engagement portion 316. The threaded portion 314 may include an exterior surface 318 and an interior surface 320. At least a portion of the interior surface 320 can be threaded so as to threadingly engage the threaded plug 306. As shown in FIG. 14, the threaded plug 306 is housed within the threaded portion 314. In some embodiments, the exterior surface 318 of the housing 304 may be knurled such that a user may be able to tighten, e.g., turn, the housing 304 relative to the threaded plug 306 by hand thereby causing the threaded plug 306 to retract away from the exterior wall 203 of the duct 201. This causes the duct grippers 308 to engage and grip an interior surface of the exterior wall 203 of the duct 201. To that end, the user may be able to tighten and/or secure the measuring probe 204, and the holding bracket 302 on the duct 201 without use of tools (e.g., screw driver). The interior surface 320 of the threaded portion 314 may be configured (e.g., threaded) as to engage with one or more portions of the threaded plug 306.

The engagement portion 316 of the housing 304 may include one or more fasteners 322 configured to secure and/or connect the threaded portion 314 to the engagement portion 316 of the housing 304. To that end, the threaded portion 314 may include one or more receiving holes 324.

The housing 304 may be any shape including, but not limited to cylindrical, polygonal, and/or any fanciful shape. For example, the housing 304 in FIG. 15 is illustrated as cylindrical.

In some embodiments, elements of the threaded plug 306 may be constructed separately and connected together, or formed as a unitary structure. The threaded plug 306 may include at least two threaded beams 330 and a connecting band 332. The embodiment in FIG. 17 illustrates the threaded plug 306 having three threaded beams 330; however, any number of threaded beams 330 may be used in the threaded plug 306 such that the measuring probe 204 positioned within the holding bracket 302 may be secured relative to the duct for an extended period of time.

Figure 18:
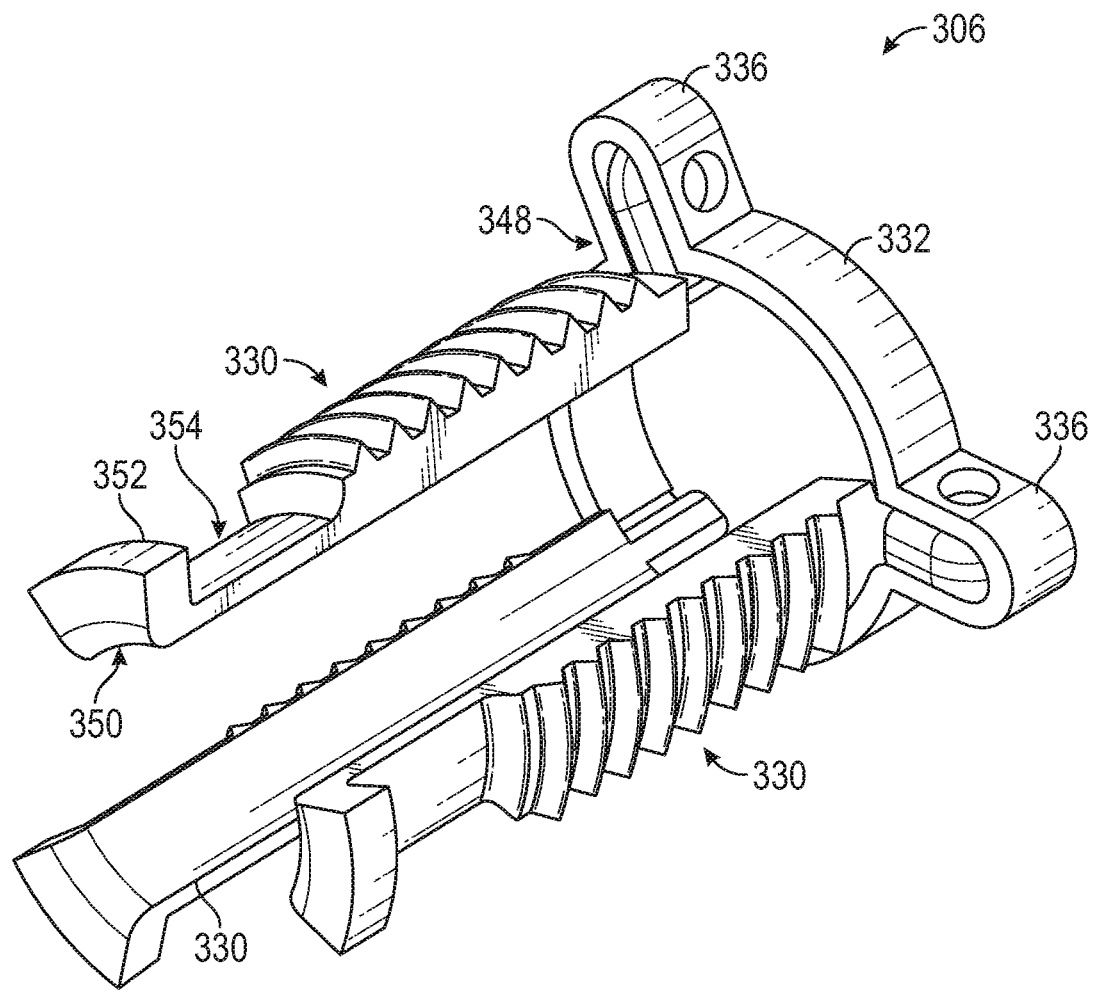
FIG. 18 illustrates a perspective view of an exemplary holding bracket for use in the portable physical flow meter of FIG. 14 in accordance with the present disclosure.

In FIG. 18, the connecting band 332 is a flat loop of material in a circular shape having projections 336. It should be noted that the connecting band 332 may be any shape including, but not limited to, a circle, square, triangle, and/or any fanciful shape. The projections 336 may be configured to support the at least two threaded beams 330. In some embodiments, the threaded beams 330 may be fixedly attached to the projections 336. In some embodiments, the threaded beams 330 may be removably attached to the projections 336.

Figure 17:
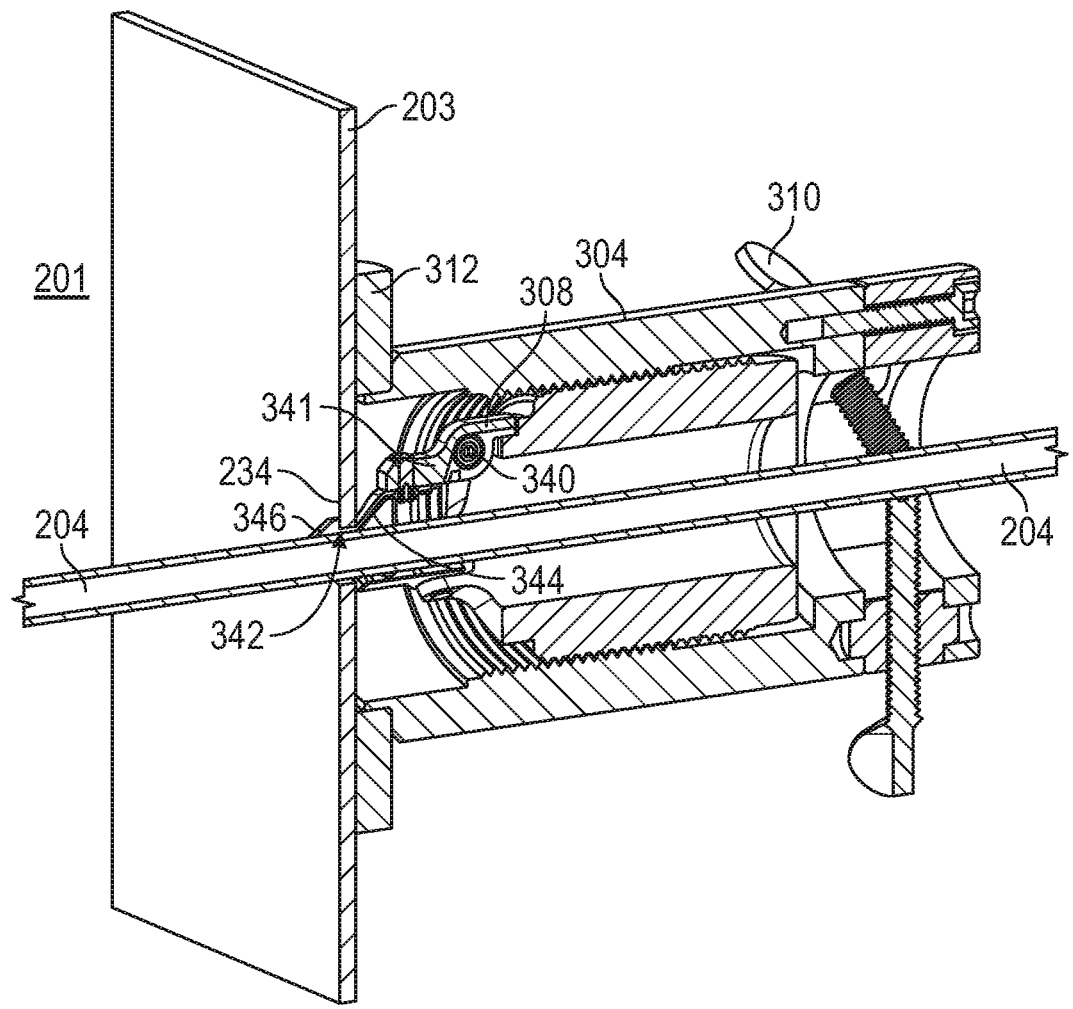
FIG. 17 illustrates a cut-away view of the portable physical flow meter of FIG. 14.

Referring to FIGS. 17 and 18, the projections 336 may include one or more securing means 340 (e.g., screws) for the duct grippers 308. The duct grippers 308 may be similar to the duct grippers 210 in FIG. 13B. In some embodiments, the duct grippers 308 may be spring loaded. The duct grippers 308 may include a support block 341 and one or more fingers 342 extending from the support block 341. The support block 341 and the one or more fingers 342 may be constructed separately and connected together, or formed as a unitary structure. The finger 342 may be adjustably secured to the support block 341 and include an elongated bar 344 and a curved end 346. During use, the elongated bar 344 and the curved end 346 of the finger 342 may be positioned within the duct 201 such that the finger 342 may grip an interior surface 234 of the exterior wall 203 securing the holding bracket 302 to the exterior wall 203 of the duct 201. The measuring probe 204 may be positioned between the fingers 342 of multiple duct grippers 308.

Each threaded beam 330 of the threaded plug 306 may have a first end 348 and a second end 350. The first end 348 may be attached and/or secured to the projection 336. The second end 350 of each threaded beam 330 may include a curved portion 352 configured to receive the engagement portion 316 of the housing 304. In some embodiments, the second end 350 of the threaded beam 330 may include a recess 354. The recess 354 may be configured to receive the engagement portion 316 of the housing 304.

Accordingly, in at least one non-limiting embodiment, the present disclosure is directed to a flow device system for use in a heating, ventilation and air conditioning (HVAC) system, comprising a controller having one or more non-transitory computer readable medium storing a set of computer executable instructions for running on one or more processors that when executed cause the one or more processors to (1) receive a plurality of signals from the HVAC system, the signals providing differential pressure across a first valve, multiple valve positions for the first valve and associated valve commands for each of said multiple valve positions, (2) receive a measured flow rate at at least a subset of said multiple valve positions from a sensor, (3) transmit a plurality of override valve commands for the multiple valve positions of the first valve, (4) determine a valve characteristic curve based on the signals provided from the HVAC system and the measured flow rate at at least the subset of said multiple valve positions, (5) determine a virtual flow through the first valve using the valve characteristic curve, (6) determine a valve dynamic behavior using valve stiction and valve stiction plus deadband, (7) update the override valve commands based on the valve dynamic behavior and the valve characteristic curve to generate updated override valve commands, and (8) transmit the updated override valve commands to a building automation system of the HVAC system. The flow device system may further comprising one or more pressure sensors for providing the signals providing differential pressure. The differential pressure may be a valve differential pressure. The differential pressure may be a fan/pump differential pressure. The computer executable instructions may further comprise an instruction to determine a stiction curve comparing the override valve commands to the multiple valve positions. Determining the valve dynamic behavior using valve stiction and valve stiction plus deadband may include determining an average valve stiction and valve stiction plus deadband using the stiction curve comparing at least the subset of the override valve commands to the multiple valve positions. The measured flow rate may include a measured water flow, wherein determination of the valve characteristic curve further includes determining a correlation between determined values of the measured water flow and the differential pressure across the first valve at the multiple valve positions and actual valve positions, and regressing such correlation.

In another non-limiting embodiment, the present disclosure is directed to a flow device system for use in a heating, ventilation and air conditioning (HVAC) system, comprising a controller having one or more non-transitory computer readable medium storing a set of computer executable instructions for running on one or more processors that when executed cause the one or more processors to (1) receive a plurality of signals from the HVAC system, the signals providing motor input power of a first motor of a fan, a head, and a motor efficiency, (2) determine a flow rate of air flowing through the HVAC system using the plurality of signals, (3) obtain an in-situ measured flow rate of air through the HVAC system, (4) determine a fan characteristic model using the determined flow rate and the in-situ measured flow rate through the HVAC system, and (5) calibrate the fan using the fan characteristic model. The flow device system may further comprise one or more pressure sensors for providing differential pressure signals. In the flow device system, wherein signals for power of the first motor may be received directly from a motor control panel of the first motor. The flow rate of air may be determined by dividing a fan differential pressure by a product of motor input power, pump efficiency and motor efficiency.

In another non-limiting embodiment, the present disclosure is directed to a heating, ventilation and air conditioning (HVAC) system, comprising a controller having one or more non-transitory computer readable medium storing a set of computer executable instructions for running on one or more processors that when executed cause the one or more processors to (1) receive a plurality of signals from the HVAC system, the signals providing differential pressure across a first valve, multiple valve positions for the first valve and associated valve commands for each of said multiple valve positions, (2) receive measured flow rate at at least a subset of said multiple valve positions from a sensor, (3) transmit a plurality of override valve commands for multiple valve positions of the first valve, (4) determine a valve characteristic curve based on the signals provided from the HVAC system and the measured flow rate at the at least the subset of said multiple valve positions, (5) determine virtual flow through the first valve using the valve characteristic curve, (6) determine valve dynamic behavior using valve stiction and valve stiction plus deadband, (7) update the override valve commands based on valve dynamic behavior and the valve characteristic curve to generate updated override valve commands, and (8) transmit the updated override valve commands to a building automation system of the HVAC system. The controller may further comprise one or more pressure sensors for providing the signals providing differential pressure. The differential pressure may be a valve differential pressure. The differential pressure may be a fan/pump differential pressure.

In another non-limiting embodiment, the present disclosure is directed to a method comprising, (1) receiving a plurality of signals from a HVAC system, the signals providing differential pressure across a first valve, multiple valve positions for the first valve and associated valve commands for each of said multiple valve positions, (2) receiving measured flow rate at at least a subset of said multiple valve positions from at least one sensor, (3) transmitting a plurality of override valve commands for the multiple valve positions of the first valve, (4) determining a valve characteristic curve based on the signals provided from the HVAC system and the measured flow rate at the at least the subset of said multiple valve positions, (5) determining a virtual flow through the first valve using the valve characteristic curve, (6) determining a valve dynamic behavior using valve stiction and valve stiction plus deadband, (7) calibrating the override valve commands based on valve dynamic behavior and the valve characteristic curve to generate calibrated override valve commands, and (8) transmit the calibrated override valve commands to a building automation system of the HVAC system, wherein at least one of said multiple valve positions is caused to be adjusted. The method may further comprise outputting information associated with the calibrated override valve commands in a form perceivable by a user and/or operator of the HVAC system. The information may be output on a computer monitor, a screen, a touchscreen, a speaker, a website, a television set, an augmented reality system, a smart phone, a PDA, a cell phone, a fax machine, a printer, a laptop computer, an optical head-mounted display, and/or any combinations thereof.

While the present disclosure has been described in connection with certain embodiments so that aspects thereof may be more fully understood and appreciated, it is not intended that the present disclosure be limited to these particular embodiments. On the contrary, it is intended that all alternatives, modifications and equivalents are included within the scope of the present disclosure. Thus the examples described above, which include particular embodiments, will serve to illustrate the practice of the present disclosure, it being understood that the particulars shown are by way of example and for purposes of illustrative discussion of particular embodiments only and are presented in the cause of providing what is believed to be the most useful and readily understood description of procedures as well as of the principles and conceptual aspects of the presently disclosed methods and compositions. Changes may be made in the structures of the various components described herein, or the methods described herein without departing from the spirit and scope of the present disclosure.

What is claimed is:

1. A flow device system for use in a heating, ventilation and air conditioning (HVAC) system, comprising:
   a controller having one or more non-transitory computer readable medium storing a set of computer executable instructions for running on one or more processors that when executed cause the one or more processors to:
   receive a plurality of signals from the HVAC system, the signals providing differential pressure across a first valve, multiple valve positions for the first valve and associated valve commands for each of said multiple valve positions;
   receive a measured flow rate at at least a subset of said multiple valve positions from a sensor;
   transmit a plurality of override valve commands for the multiple valve positions of the first valve;
   determine a valve characteristic curve based on the signals provided from the HVAC system and the measured flow rate at at least the subset of said multiple valve positions;
   determine a virtual flow through the first valve using the valve characteristic curve;
   determine a valve dynamic behavior using valve stiction and valve stiction plus deadband;
   update the override valve commands based on the valve dynamic behavior and the valve characteristic curve to generate updated override valve commands; and,
   transmit the updated override valve commands to a building automation system of the HVAC system.

2. The flow device system of claim 1, further comprising one or more pressure sensors for providing the signals providing differential pressure.

3. The flow device system of claim 2, wherein the differential pressure is a valve differential pressure.

4. The flow device system of claim 2, wherein the differential pressure is a fan/pump differential pressure.

5. The flow device system of claim 1, wherein the computer executable instructions further comprise an instruction to determine a stiction curve comparing the override valve commands to the multiple valve positions.

6. The flow device system of claim 5, wherein determining the valve dynamic behavior using valve stiction and valve stiction plus deadband includes determining an average valve stiction and valve stiction plus deadband using the stiction curve comparing at least the subset of the override valve commands to the multiple valve positions.

7. The flow device system of claim 1, wherein the measured flow rate includes a measured water flow, wherein determination of the valve characteristic curve further includes determining a correlation between determined values of the measured water flow and the differential pressure across the first valve at the multiple valve positions and actual valve positions, and regressing such correlation.

8. A flow device system for use in a heating, ventilation and air conditioning (HVAC) system, comprising:
   a controller having one or more non-transitory computer readable medium storing a set of computer executable instructions for running on one or more processors that when executed cause the one or more processors to:
   receive a plurality of signals, the signals providing motor input power of a first motor of a fan, a fan head, and a motor efficiency;
   determine a virtual flow rate of air flowing through the HVAC system using the plurality of signals;
   obtain an in-situ measured flow rate of air through a duct within the HVAC system, the in-situ measured flow rate of air being obtained by a measuring probe extending through a hole in an exterior wall of the duct, the measuring probe supported by a holding bracket connected to the exterior wall of the duct with duct grippers;
   determine a fan characteristic model using the determined virtual flow rate and the in-situ measured flow rate through the HVAC system; and,
   calibrate the fan using the fan characteristic model.

9. The flow device system of claim 8, further comprising one or more pressure sensors for providing differential pressure signals.

10. The flow device system of claim 8, wherein signals for power of the first motor are received directly from a motor control panel of the first motor.

11. The flow device system of claim 8, wherein the virtual flow rate of air is determined by dividing a fan differential pressure by a product of motor input power, pump efficiency and motor efficiency.

12. A heating, ventilation and air conditioning (HVAC) system, comprising:
a controller having one or more non-transitory computer readable medium storing a set of computer executable instructions for running on one or more processors that when executed cause the one or more processors to:
receive a plurality of signals from the HVAC system, the signals providing differential pressure across a first valve, multiple valve positions for the first valve and associated valve commands for each of said multiple valve positions;
receive measured flow rate at at least a subset of said multiple valve positions from a sensor;
transmit a plurality of override valve commands for multiple valve positions of the first valve;
determine a valve characteristic curve based on the signals provided from the HVAC system and the measured flow rate at the at least the subset of said multiple valve positions;
determine virtual flow through the first valve using the valve characteristic curve;
determine valve dynamic behavior using valve stiction and valve stiction plus deadband;
update the override valve commands based on valve dynamic behavior and the valve characteristic curve to generate updated override valve commands; and,
transmit the updated override valve commands to a building automation system of the HVAC system.

13. The HVAC system of claim 12, wherein the controller further comprises one or more pressure sensors for providing the signals providing differential pressure.

14. The HVAC system of claim 13, wherein the differential pressure is a valve differential pressure.

15. The HVAC system of claim 13, wherein the differential pressure is a fan/pump differential pressure.

16. A method comprising:
receiving a plurality of signals from a HVAC system, the signals providing differential pressure across a first valve, multiple valve positions for the first valve and associated valve commands for each of said multiple valve positions;
receiving measured flow rate at at least a subset of said multiple valve positions from at least one sensor;
transmitting a plurality of override valve commands for the multiple valve positions of the first valve;
determining a valve characteristic curve based on the signals provided from the HVAC system and the measured flow rate at the at least the subset of said multiple valve positions;
determining a virtual flow through the first valve using the valve characteristic curve;
determining a valve dynamic behavior using valve stiction and valve stiction plus deadband;
calibrating the override valve commands based on valve dynamic behavior and the valve characteristic curve to generate calibrated override valve commands; and,
transmit the calibrated override valve commands to a building automation system of the HVAC system, wherein at least one of said multiple valve positions is caused to be adjusted.

17. The method of claim 16, further comprising outputting information associated with the calibrated override valve commands in a form perceivable by a user and/or operator of the HVAC system.

18. The method of claim 17, wherein the information is output on a computer monitor, a screen, a touchscreen, a speaker, a website, a television set, an augmented reality system, a smart phone, a PDA, a cell phone, a fax machine, a printer, a laptop computer, an optical head-mounted display, and/or any combinations thereof.

* * * * *

UNITED STATES PATENT AND TRADEMARK OFFICE
CERTIFICATE OF CORRECTION

PATENT NO. : 10,976,069 B2
APPLICATION NO. : 16/230422
DATED : April 13, 2021
INVENTOR(S) : Song et al.

Page 1 of 1

It is certified that error appears in the above-identified patent and that said Letters Patent is hereby corrected as shown below:

On the Title Page

Under the item Assignee (73): After "The Board of Regents of the University of Oklahoma, Norman, OK (US)" insert --The University of Miami, Miami, FL (US)--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*